(12) United States Patent
Murata et al.

(10) Patent No.: US 6,672,989 B2
(45) Date of Patent: Jan. 6, 2004

(54) DIRECT INJECTION TYPE ENGINE

(75) Inventors: Hiroki Murata, Susono (JP); Shizuo Sasaki, Numazu (JP); Kohei Igarashi, Susono (JP)

(73) Assignee: Toyota Jidosha Kabushiki Kaisha, Tokyo (JP)

(*) Notice: Subject to any disclaimer, the term of this patent is extended or adjusted under 35 U.S.C. 154(b) by 5 days.

(21) Appl. No.: 10/061,194

(22) Filed: Feb. 4, 2002

(65) Prior Publication Data

US 2002/0107105 A1 Aug. 8, 2002

(30) Foreign Application Priority Data

Feb. 6, 2001 (JP) .......................... 2001-029999

(51) Int. Cl.[7] ............................. F16H 59/60
(52) U.S. Cl. ........................... 477/97; 477/902
(58) Field of Search .................... 477/97, 121, 902; 701/54, 56

(56) References Cited

U.S. PATENT DOCUMENTS

| | | | |
|---|---|---|---|
| 5,385,017 A | | 1/1995 | Harada |
| 5,440,880 A | * | 8/1995 | Ceynow et al. ............ 60/605.2 |
| 5,468,196 A | * | 11/1995 | Minowa et al. ............... 477/62 |
| 5,974,791 A | | 11/1999 | Hirota et al. |
| 6,063,004 A | * | 5/2000 | Ibamoto et al. ............... 477/47 |
| 6,135,917 A | | 10/2000 | Takizawa et al. |
| 6,467,255 B1 | * | 10/2002 | Grob et al. ..................... 60/274 |
| 6,467,257 B1 | * | 10/2002 | Khair et al. .................... 60/278 |
| 2001/0027646 A1 | * | 10/2001 | Kimura et al. ................. 60/297 |

FOREIGN PATENT DOCUMENTS

| | | |
|---|---|---|
| JP | A 6-129241 | 5/1994 |
| JP | A 6-213056 | 8/1994 |
| JP | A6-272541 | 9/1994 |
| JP | A10-73018 | 3/1998 |
| JP | A10-306717 | 11/1998 |
| JP | A 2000-46177 | 2/2000 |
| JP | P-2000-230418 | 8/2000 |

* cited by examiner

*Primary Examiner*—Charles A Marmor
*Assistant Examiner*—Dennis Abdelnour
(74) *Attorney, Agent, or Firm*—Oliff & Berridge, PLC

(57) ABSTRACT

A direct injection type engine comprising a variable speed transmission. Engine control lines indicating the relationship between the engine rotational speed and required torque necessary for obtaining a required output are comprised of a first control line and a second control line at the high torque side and low speed side of the first control line. When the degree of activation of the exhaust gas purification device is low, the required torque and the engine rotational speed are made ones on the first control line in accordance with the required output, while when the degree of activation is high, the required torque and the engine rotational speed are made ones on the second control line in accordance with the required output.

17 Claims, 18 Drawing Sheets

DIRECT INJECTION TYPE ENGINE

BACKGROUND OF THE INVENTION

1. Field of the Invention

The present invention relates to a direct injection type engine.

2. Description of the Related Art

The output of an internal combustion engine is expressed by the product of the torque and rotational speed. Therefore, there are various combinations of torque and rotational speed giving the same torque. In this case, comparing the case of raising the torque and lowering the rotational speed and the case of lowering the torque and raising the rotational speed in order to obtain the same output, the case of a high torque and low speed is better in fuel economy than a low torque and high speed, but the amount of emission of soot, $NO_x$, and other harmful components increases. A low torque and high speed suffers from worse fuel economy compared with a high torque and low speed, but results in less emission of soot, $NO_x$, and other harmful components.

In a direct injection type internal combustion engine, for example, a compression ignition type internal combustion engine, however, various types of exhaust gas purification catalysts have conventionally been arranged in the engine exhaust passage. These catalysts, however, generally do not activate until 250° C. to 300° C. or more. As opposed to this, in a compression ignition type internal combustion engine, sometimes the temperature of the exhaust gas falls below 250° C. At such times, the catalysts become inactive and therefore the harmful components in the exhaust gas can no longer be purified. Therefore, a compression ignition type internal combustion engine is normally controlled so as to lower the torque and increase the rotational speed so as to keep the amount of emission of harmful components in the exhaust gas low in consideration of times when the temperature of the exhaust gas becomes low.

If the engine is controlled in this way to lower the torque and raise the speed, however, the problem arises of a poor fuel economy.

SUMMARY OF THE INVENTION

An object of the present invention is to provide a direct injection type engine capable of suitably treating soot and $NO_x$ while maintaining a good fuel economy.

According to a first aspect of the present invention, there is provided a direct injection type engine provided with an exhaust passage, comprising a variable speed transmission connected with the engine and able to freely change a gear ratio; an exhaust purification device arranged in the exhaust passage; and a control device for controlling a torque generated by the engine and a gear ratio of the variable speed transmission; at least two control lines which include a first control line and a second control line at a high torque side and low speed side of the first control line in the same required output being set as engine control lines showing the relationship between the engine rotational speed and required torque required for obtaining a required output, the control device causing the engine to generate a required torque on the first control line in accordance with the required output and controlling the gear ratio of the variable speed transmission to give an engine rotational speed on the first control line in accordance with the required output when the extent of activation of the exhaust purification device is low, the control device causing the engine to generate a required torque on the second control line in accordance with the required output and controlling the gear ratio of the variable speed transmission to give an engine rotational speed on the second control line in accordance with the required output when the extent of activation of the exhaust purification device is high.

According to a second aspect of the present invention, there is provided a direct injection type engine provided with an exhaust passage, comprising a transmission connected with the engine and having a plurality of speeds automatically changeable; an exhaust purification device arranged in the exhaust passage; and a control device for changing a speed of the transmission; first boundary lines and second boundary lines at a lower vehicle speed side than the first boundary lines being set as speed boundary lines indicating the relationship between representative values of the required torque and representative values of the vehicle speed at boundaries of different speeds, the control device changing the speeds at the first boundary lines when the degree of activation of the exhaust gas purification device is low and changing the speeds at the second boundary lines when the degree of activation of the exhaust gas purification device is high.

BRIEF DESCRIPTION OF THE DRAWINGS

The present invention may be more fully understood from the description of the preferred embodiments of the invention set forth below together with the accompanying drawings, in which.

DESCRIPTION OF THE PREFERRED EMBODIMENTS

Figure 1:
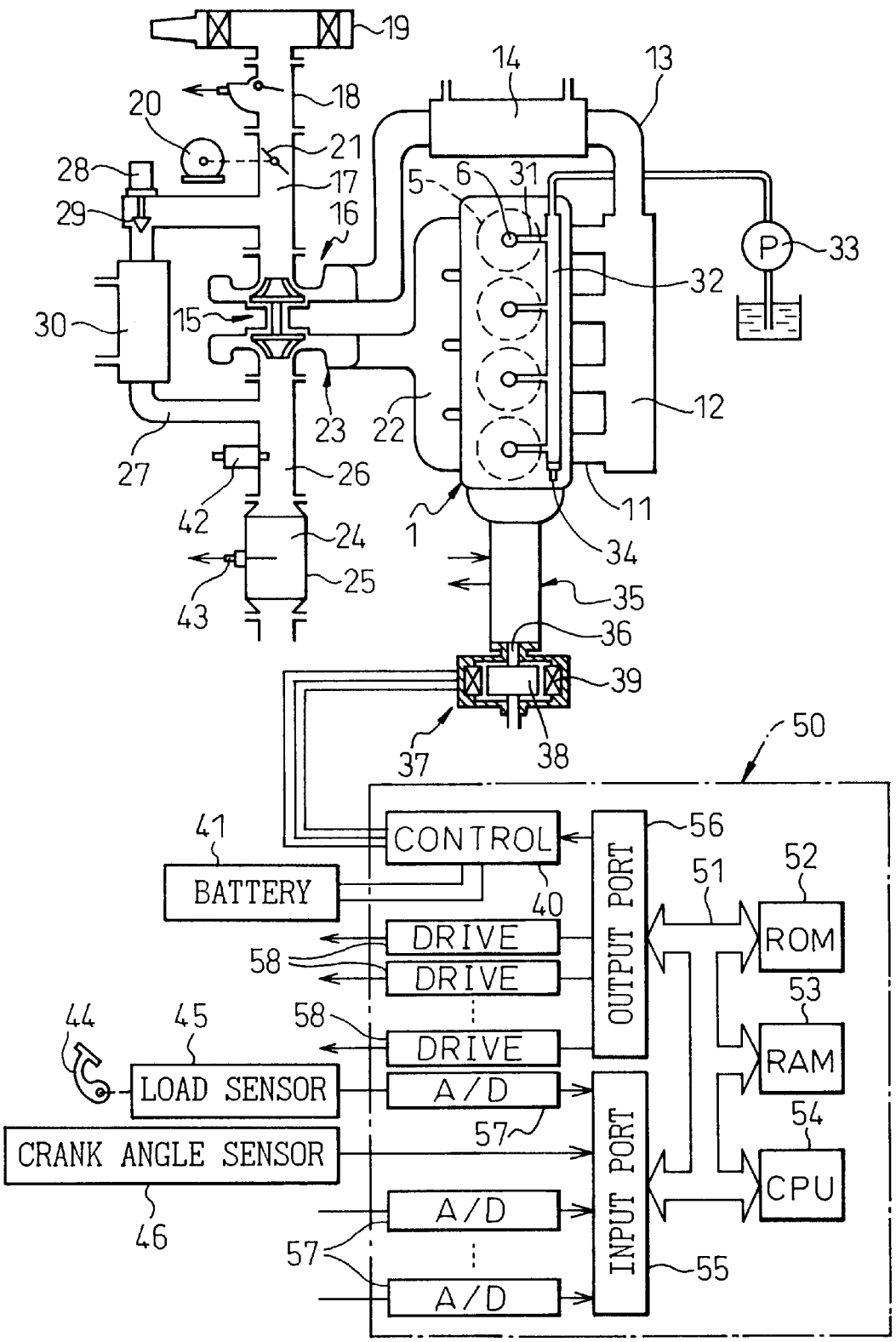
FIG. 1 is an overall view of a compression ignition type engine.
Figure 2:
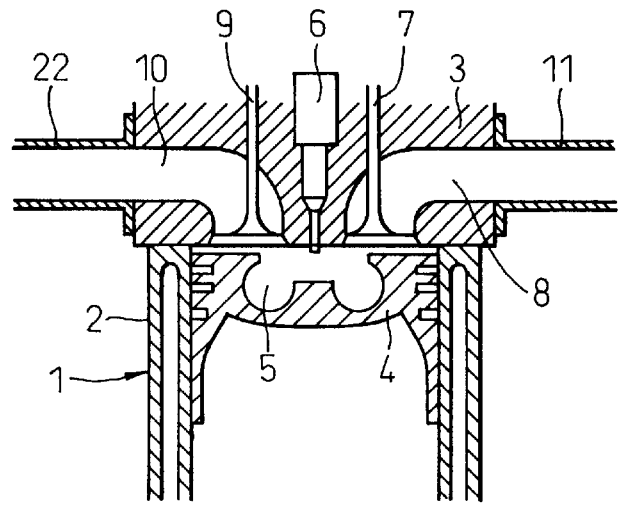
FIG. 2 is a side sectional view of the engine body.

FIG. 1 and FIG. 2 show the case of application of the present invention to a four-stroke compression ignition type engine.

Referring to FIG. 1 and FIG. 2, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake tube 11 to the surge tank 12. The surge tank 12 is connected through an intake duct 13 and an intercooler 14 to an outlet of a compressor 16 of a supercharger, for example, an exhaust turbocharger 15. The inlet of the compressor 16 is connected through an intake duct 17 and air flowmeter 18 to an air cleaner 19. A throttle valve 21 driven by a step motor 20 is arranged in the intake duct 17.

On the other hand, the exhaust port 10 is connected through an exhaust manifold 22 to an inlet of an exhaust turbine 23 of the exhaust turbocharger 15. The outlet of the exhaust turbine 23 is connected through an exhaust pipe 26 to a casing 25 housing a particulate filter 24. The exhaust pipe 26 and the intake duct 17 downstream of the throttle valve 21 are connected to each other through an EGR passage 27. Inside the EGR passage 27 is arranged an EGR control valve 29 driven by a step motor 28. Further, inside the EGR passage 27 is arranged an EGR cooler 30 for cooling the EGR gas flowing inside the EGR passage 27. In the embodiment shown in FIG. 1, the engine cooling water is led inside the EGR cooler 30 where the EGR gas is cooled by the engine cooling water.

On the other hand, each fuel injector 6 is connected through a fuel supply tube 31 to the fuel reservoir, that is, a common rail 32. Fuel is supplied to the common rail 32 from an electrically controlled variable discharge fuel pump 33. Fuel supplied in the common rail 32 is supplied through each fuel supply tube 31 to the fuel injectors 6. A fuel pressure sensor 34 for detecting the fuel pressure in the common rail 32 is attached to the common rail 32. The amount of discharge of the fuel pump 33 is controlled based on the output signal of the fuel pressure sensor 34 so that the fuel pressure in the common rail 32 becomes the target fuel pressure.

On the other hand, in the embodiment shown in FIG. 1, the output shaft of the engine is connected to a transmission 35. An electric motor 37 is connected to the output shaft of the transmission 35. In this case, as the transmission 35, it is possible to use an ordinary automatic transmission provided with a torque converter, various types of variable speed transmissions, an automatic transmission of a type enabling automatic clutch operation and gear changing operation in a manual transmission provided with a clutch, etc.

Further, the electric motor 37 connected to the output shaft 36 of the transmission 35 comprises a drive power generating apparatus for generating a drive power separate from the drive power of the engine. In the embodiment shown in FIG. 1, the electric motor 37 is comprised of an AC synchronous electric motor provided with a rotor 38 attached on the output shaft 36 of the transmission 35 and comprised of a plurality of permanent magnets attached to its outer circumference and a stator 39 comprised of an exciting coil forming a rotating field. The exciting coil of the stator 39 is connected to a motor drive control circuit 40. The motor drive control circuit 40 is connected to a battery 41 generating a DC high voltage.

The electronic control unit 50 is comprised of a digital computer and is provided with a read only memory (ROM) 52, a random access memory (RAM) 53, a microprocessor (CPU) 54, an input port 55, and an output port 56 connected to each other by a bidirectional bus 51. The output signals of the air flowmeter 18 and fuel pressure sensor 34 are input through the corresponding AD converters 57 to the input port 55. Inside the casing 25 housing the particulate filter 24 is arranged a temperature sensor 43 for detecting the temperature of the particulate filter 24. The output signal of the temperature sensor 43 is input through the corresponding AD converter 57 to the input port 55. Note that it is also possible not to provide such a temperature sensor 43, but to estimate the temperature of the particulate filter 24 using a model showing the relationship between the operating state of the engine and the temperature of the particulate filter 24. Further, the input port 55 receives as input various signals expressing a gear ratio or gear of the transmission 35, a rotational speed of the output shaft 36, etc.

On the other hand, the accelerator pedal 44 has connected to it a load sensor 45 for generating an output voltage proportional to the amount of depression L of the accelerator pedal 44. The output voltage of the load sensor 45 is input through a corresponding AD converter 57 to the input port 55. Further, the input port 55 has connected to it a crank angle sensor 46 for generating an output pulse each time the crankshaft rotates by for example 30°. On the other hand, the inlet of the casing 25 housing the particulate filter 24 has arranged at it a hydrocarbon feed valve 42 for supplying a hydrocarbon, for example, fuel, to the exhaust gas, while the output port 56 has connected to it through a corresponding drive circuit 58 the fuel injectors 6, step motor 20, EGR control valve 28, fuel pump 33, transmission 35, motor drive control circuit 40, and hydrocarbon feed valve 42.

The supply of power to the exciting coil of the stator 39 of the electric motor 37 is normally stopped. At that time, the rotor 38 rotates together with the output shaft 36 of the transmission 37. On the other hand, when driving the electric motor 37, the DC high voltage of the battery 41 is converted by the motor drive control circuit 40 to a three-phase AC current having a frequency fm and a current value Im. This three-phase alternating current is supplied to the exciting coil of the stator 39. The frequency fm is the frequency required for making the rotating field generated by the exciting coil rotate in synchronization with the rotation of the rotor 38. The frequency fm is calculated by the CPU 54 based on the rotational speed of the output shaft 36. In the motor drive control circuit 40, this frequency fm is made the frequency of a three-phase alternating current.

On the other hand, the output torque of the electric motor 37 is substantially proportional to the current value Im of the three-phase alternating current. The current value Im is calculated by the CPU 54 based on the requested output torque of the electric motor 37. In the motor drive control circuit 40, this current value Im is made the current value of the three-phase alternating current.

Further, when the electric motor is in a state driven by outside force, the electric motor 37 operates as a generator. The electric power generated at that time is stored in the battery 41. Whether or not the electric motor 37 should be driven by outside force is judged by the CPU 54. When it is judged that the electric motor 37 is to be driven by outside force, the motor drive control circuit 40 operates so that the electric power generated by the electric motor 37 is stored in the battery 41.

Figure 3:
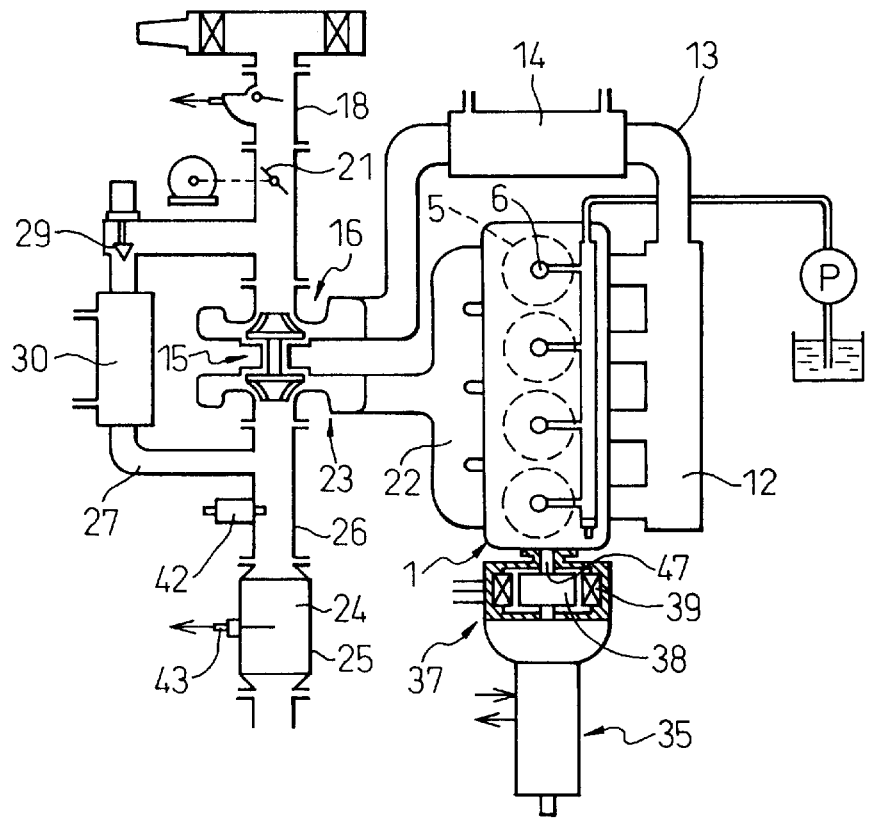
FIG. 3 is an overall view of another embodiment of a compression ignition type engine.

FIG. 3 shows another embodiment of a compression ignition type engine. In this embodiment, the electric motor 37 is connected to the output shaft of the engine, while the transmission 35 is connected to the output shaft of the electric motor 37. In this embodiment, the rotor 38 of the electric motor 37 is attached to the output shaft 47 of the engine. Therefore, the rotor 38 rotates together with the output shaft 47 of the engine at all times. Further, in this embodiment as well, as the transmission 35, it is possible to use an ordinary automatic transmission provided with a torque converter, various types of variable speed transmissions, an automatic transmission of a type enabling automatic clutch operation and gear changing operation in a manual transmission provided with a clutch, etc.

Figure 4A:
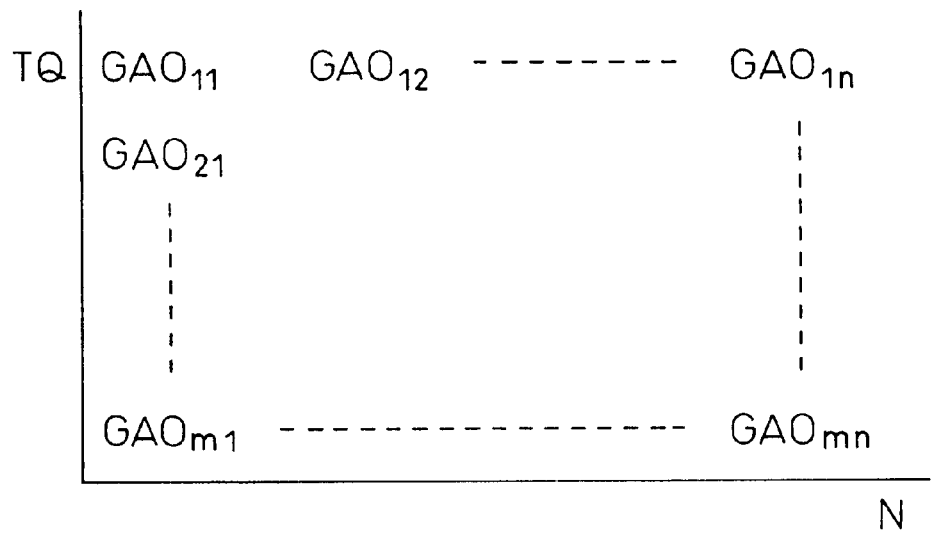
FIGS. 4A and 4B are views of maps of the target amount of intake air.
Figure 4B:
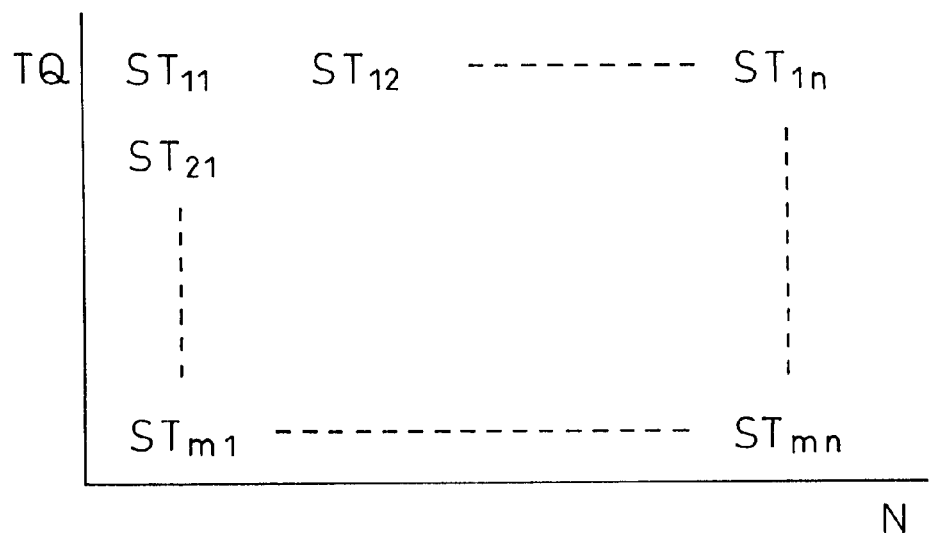
Figure 5:
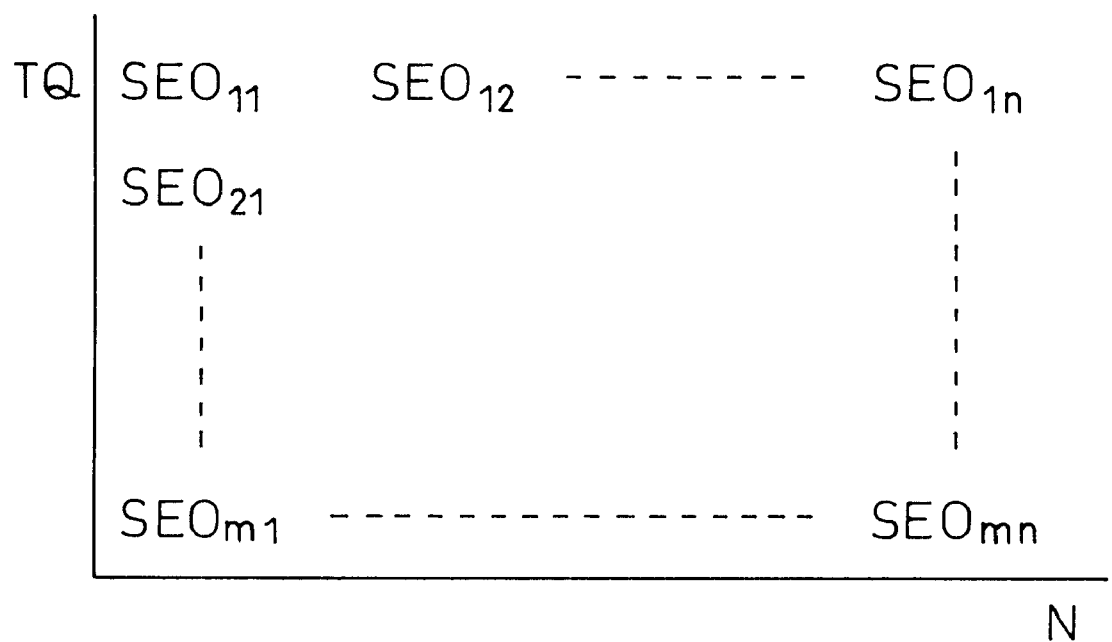
FIG. 5 is a view of a map of the predicted reference opening degree.

In this embodiment of the present invention, the target amount of intake air GAO required for making the air-fuel ratio the stoichiometric air-fuel ratio is stored in advance in the ROM 52 in the form of a map as a function of the required torque TQ and the engine rotational speed N as shown in FIG. 4A. Further, the target opening degree ST of the throttle valve 21 is stored in the ROM 52 in advance in the form of a map as a function of the required torque TQ and the engine rotational speed N as shown in FIG. 4B. On the other hand, the opening degree of the EGR control valve 29 is controlled so that the amount of intake air becomes the target amount of intake air GAO detected by the air flowmeter 18. Further, the predicted reference opening degree SEO of the EGR control valve 29 which can be taken at normal times, that is, when the particulate filter 24 is not clogged, is stored in the ROM 52 in advance in the form of a map as a function of the required torque TQ and engine rotational speed N as shown in FIG. 5.

Figure 6A:
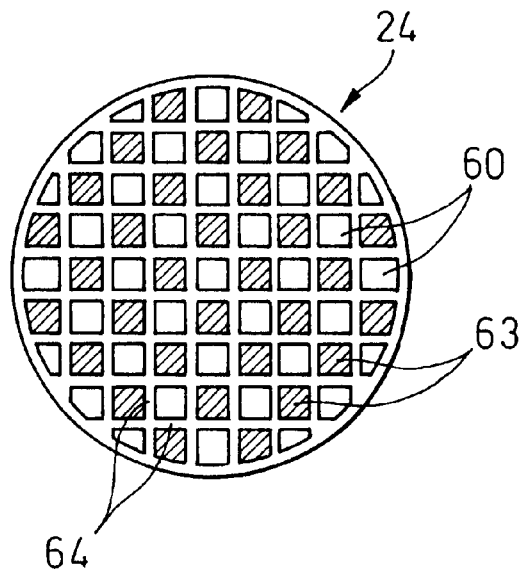
FIGS. 6A and 6B are views of a particulate filter.
Figure 6B:
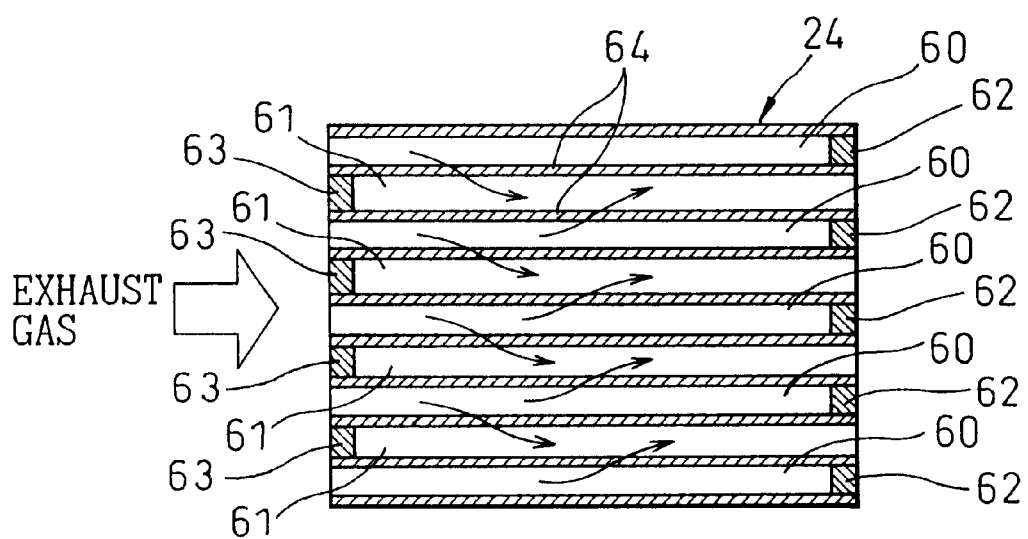

Next, an explanation will be given of the structure of the particulate filter 24 accommodated in the casing 25 in FIG. 1 and FIG. 3 with reference to FIGS. 6A and 6B. Note that FIG. 6A is a front view of the particulate filter 24, while FIG. 6B is a side sectional view of the particulate filter. As shown in FIGS. 6A and 6B, the particulate filter 24 forms a honeycomb structure and is provided with a plurality of exhaust circulation passages 60 and 61 extending in parallel with each other. These exhaust circulation passages are comprised by exhaust gas inflow passages 60 with downstream ends sealed by plugs 62 and exhaust gas outflow passages 61 with upstream ends sealed by plugs 63. Note that the hatched portions in FIG. 6A show plugs 63. Therefore, the exhaust gas inflow passages 60 and the exhaust gas outflow passages 61 are arranged alternately through thin wall partitions 64. In other words, the exhaust gas inflow passages 60 and the exhaust gas outflow passages 61 are arranged so that each exhaust gas inflow passage 60 is surrounded by four exhaust gas outflow passages 61, and each exhaust gas outflow passage 61 is surrounded by four exhaust gas inflow passages 60.

The particulate filter 24 is formed from a porous material such as for example cordierite. Therefore, the exhaust gas flowing into the exhaust gas inflow passages 60 flows out into the adjoining exhaust gas outflow passages 61 through the surrounding partitions 64 as shown by the arrows in FIG. 6B.

In this embodiment of the present invention, a layer of a carrier comprised of for example alumina is formed on the peripheral surfaces of the exhaust gas inflow passages 60 and exhaust gas outflow passages 61, that is, the two side surfaces of the partitions 64 and the inside walls of the fine holes in the partitions 64. On the carrier are carried a precious metal catalyst and an active oxygen release agent which takes in the oxygen and holds the oxygen if excess oxygen is present in the surroundings and releases the held oxygen in the form of active oxygen if the concentration of the oxygen in the surroundings falls.

In this case, in this embodiment according to the present invention, platinum Pt is used as the precious metal catalyst.

As the active oxygen release agent, use is made of at least one of an alkali metal such as potassium K, sodium Na, lithium Li, cesium Cs, and rubidium Rb, an alkali earth metal such as barium Ba, calcium Ca, and strontium Sr, a rare earth such as lanthanum La, yttrium Y, and cerium Ce, and a transition metal.

Note that in this case, as the active oxygen release agent, use is preferably made of an alkali metal or an alkali earth metal with a higher tendency of ionization than calcium Ca, that is, potassium K, lithium Li, cesium Cs, rubidium Rb, barium Ba, and strontium Sr.

Next, the action of removal of the particulate in the exhaust gas by the particulate filter 24 will be explained taking as an example the case of carrying platinum Pt and potassium K on a carrier, but the same type of action for removal of particulate is performed even when using another precious metal, alkali metal, alkali earth metal, rare earth, and transition metal.

In a compression ignition type engine such as shown in FIG. 1 and FIG. 3, combustion occurs under an excess of air. Therefore, the exhaust gas contains a large amount of excess air. That is, if the ratio of the air and fuel fed into the intake passage, combustion chamber 5, and exhaust passage is called the air-fuel ratio of the exhaust gas, then in a compression ignition type engine such as shown in FIG. 1 and FIG. 3, the air-fuel ratio of the exhaust gas becomes lean. Further, in the combustion chamber 5, NO is generated, so the exhaust gas contains NO. Further, the fuel contains sulfur S. This sulfur S reacts with the oxygen in the combustion chamber 5 to become $SO_2$. Therefore, the fuel contains $SO_2$. Accordingly, exhaust gas containing excess oxygen, NO, and $SO_2$ flows into the exhaust gas inflow passages 60 of the particulate filter 24.

Figure 7A:
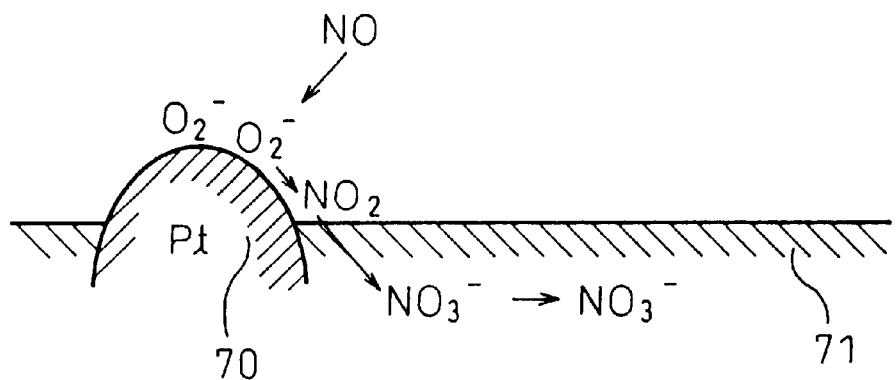
FIGS. 7A and 7B are views for explaining an oxidation action of particulate.
Figure 7B:
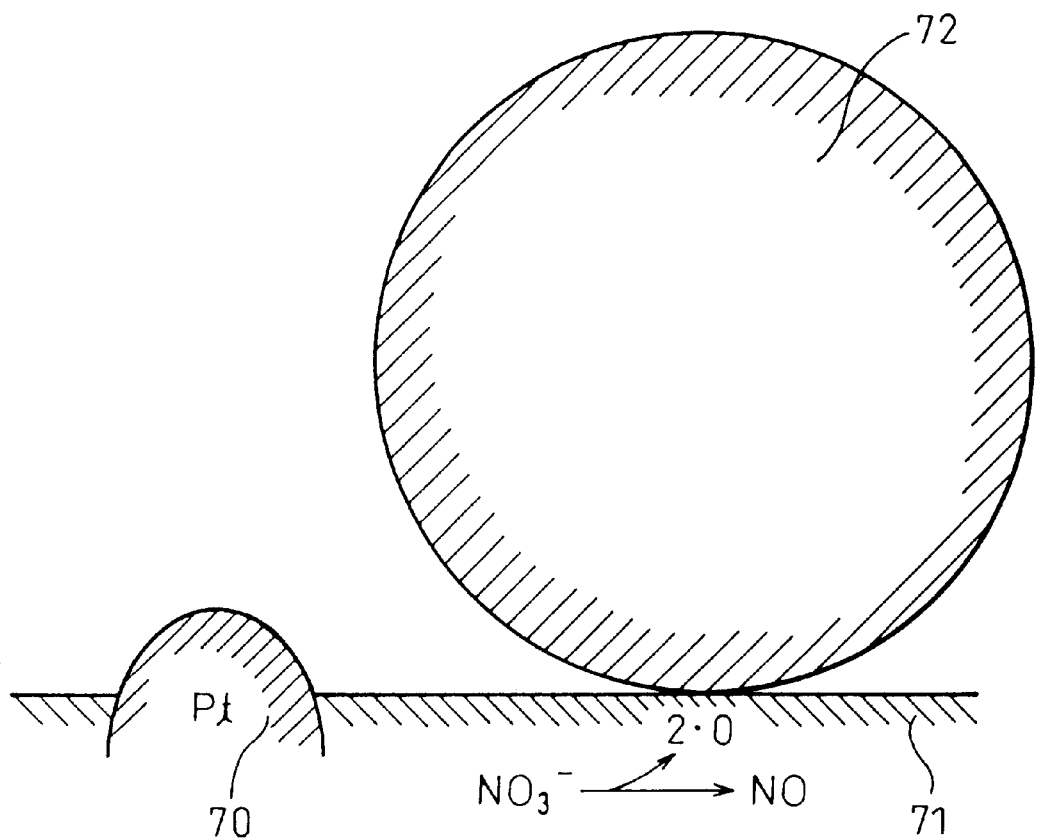

FIGS. 7A and 7B are enlarged views of the surface of the carrier layer formed on the inner peripheral surfaces of the exhaust gas inflow passages 60 and the inside walls of the fine holes in the partitions 64. Note that in FIGS. 7A and 7B, 70 indicates particles of platinum Pt, while 71 indicates the active oxygen release agent containing potassium K.

In this way, since a large amount of excess oxygen is contained in the exhaust gas, if the exhaust gas flows into the exhaust gas inflow passages 60 of the particulate filter 24, as shown in FIG. 7A, the oxygen $O_2$ adheres to the surface of the platinum Pt in the form of $O_2^-$ or $O^{2-}$. On the other hand, the NO in the exhaust gas reacts with the $O_2^-$ or $O^{2-}$ on the surface of the platinum Pt to become $NO_2$ ($2NO + O_2 \rightarrow 2NO_2$). Next, part of the $NO_2$ which is produced is absorbed in the active oxygen release agent 71 while being oxidized on the platinum Pt and diffuses in the active oxygen release agent 71 in the form of nitrate ions $NO_3^-$ as shown in FIG. 7A. Part of the nitrate ions $NO_3^-$ produces potassium nitrate $KNO_3$.

On the other hand, as explained above, the exhaust gas also contains $SO_2$. This $SO_2$ is absorbed in the active oxygen release agent 71 by a mechanism similar to that of NO. That is, in the above way, the oxygen $O_2$ adheres to the surface of the platinum Pt in the form of $O_2^-$ or $O^{2-}$. The $SO_2$ in the exhaust gas reacts with the $O_2^-$ or $O^{2-}$ on the surface of the platinum Pt to become $SO_3$. Next, part of the $SO_3$ which is produced is absorbed in the active oxygen release agent 71 while being oxidized on the platinum Pt and diffuses in the active oxygen release agent 71 in the form of sulfate ions $SO_4^{2-}$ while bonding with the potassium K to produce potassium sulfate $K_2SO_4$. In this way, potassium nitrate $KNO_3$ and potassium sulfate $K_2SO_4$ are produced in the active oxygen release agent 71.

On the other hand, particulate comprised of mainly carbon, that is, soot, is produced in the combustion chamber 5. Therefore, the exhaust gas contains this particulate. This particulate contacts and adheres to the surface of the carrier layer, for example, the surface of the active oxygen release agent 71, as shown in FIG. 7B when the exhaust gas is flowing through the exhaust gas inflow passages 60 of the particulate filter 24 or when flowing from the exhaust gas inflow passages 60 to the exhaust gas outflow passages 61.

If the particulate 72 adheres to the surface of the active oxygen release agent 71 in this way, the concentration of oxygen at the contact surface of the particulate 72 and the active oxygen release agent 71 falls. If the concentration of oxygen falls, a difference in concentration occurs with the inside of the high oxygen concentration active oxygen release agent 71 and therefore the oxygen in the active oxygen release agent 71 moves toward the contact surface between the particulate 72 and the active oxygen release agent 71. As a result, the potassium nitrate $KNO_3$ formed in the active oxygen release agent 71 is broken down into potassium K, oxygen O, and NO. The oxygen O heads toward the contact surface between the particulate 72 and the active oxygen release agent 71, while the NO is released from the active oxygen release agent 71 to the outside. The NO released to the outside is oxidized on the downstream side platinum Pt and is again absorbed in the active oxygen release agent 71.

On the other hand, at this time, the potassium sulfate $K_2SO_4$ formed in the active oxygen release agent 71 is also broken down into potassium K, oxygen O, and $SO_2$. The oxygen O heads toward the contact surface between the particulate 72 and the active oxygen release agent 71, while the $SO_2$ is released from the active oxygen release agent 71 to the outside. The $SO_2$ released to the outside is oxidized on the downstream side platinum Pt and again absorbed in the active oxygen release agent 71.

On the other hand, the oxygen O heading toward the contact surface between the particulate 72 and the active oxygen release agent 71 is the oxygen broken down from compounds such as potassium nitrate $KNO_3$ or potassium sulfate $K_2SO_4$. The oxygen O broken down from these compounds has a high energy and has an extremely high activity. Therefore, the oxygen heading toward the contact surface between the particulate 72 and the active oxygen release agent 71 becomes active oxygen O. If this active oxygen O contacts the particulate 72, the particulate 72 is oxidized without emitting a luminous flame in a short period and the particulate 72 is completely eliminated. Therefore, the particulate 72 does not build up on the particulate filter 24. Note that the particulate 72 deposited on the particulate filter 24 in this way is oxidized by the active oxygen O, but the particulate 72 is also oxidized by the oxygen in the exhaust gas.

When the particulate deposited in layers on the particulate filter 24 is burned, the particulate filter 24 becomes red hot and burns along with a flame. This burning along with a flame does not continue unless the temperature is high. Therefore, to continue burning along with such flame, the temperature of the particulate filter 24 must be maintained at a high temperature.

As opposed to this, in this embodiment of the present invention, the particulate 72 is oxidized without emitting a luminous flame as explained above. At this time, the surface of the particulate filter 24 does not become red hot. That is, in other words, in this embodiment of the present invention, the particulate 72 is removed by oxidation by a considerably low temperature. Accordingly, the action of removal of the particulate 72 by oxidation without emitting a luminous flame according to this embodiment of the present invention is completely different from the action of removal of particulate by burning accompanied with a flame.

The platinum Pt and the active oxygen release agent 71 become more active the higher the temperature of the particulate filter 24, so the amount of the active oxygen O able to be released by the active oxygen release agent 71 per unit time increases the higher the temperature of the particulate filter 24. Therefore, the amount of the particulate removable by oxidation per unit time without emitting a luminous flame on the particulate filter 24 increases the higher the temperature of the particulate filter 24.

Figure 9:
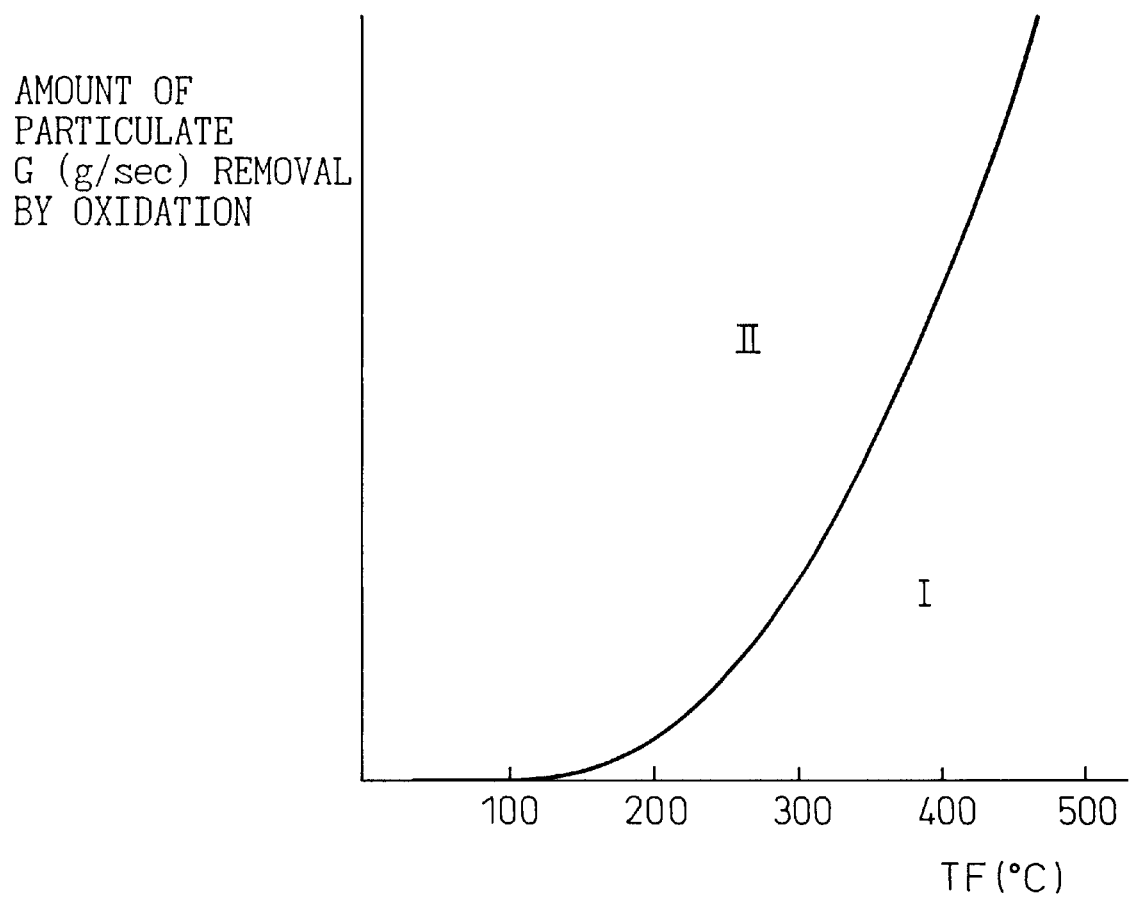
FIG. 9 is a view of the relationship between the amount of particulate removable by oxidation and the temperature of the particulate filter.

The solid line in FIG. 9 shows the amount G of the particulate removable by oxidation per unit time without emitting a luminous flame. The abscissa of FIG. 9 shows the temperature TF of the particulate filter 24. If the amount of particulate exhausted from the combustion chamber 5 per unit time is called the amount of discharged particulate M, when the amount of discharged particulate M is smaller than the amount G of particulate removable by oxidation, that is, in the region I of FIG. 9, when contacting the particulate filter 24, all of the particulate discharged from the combustion chamber 5 is removed by oxidation successively in a short time without emitting a luminous flame on the particulate filter 24.

Figure 8A:
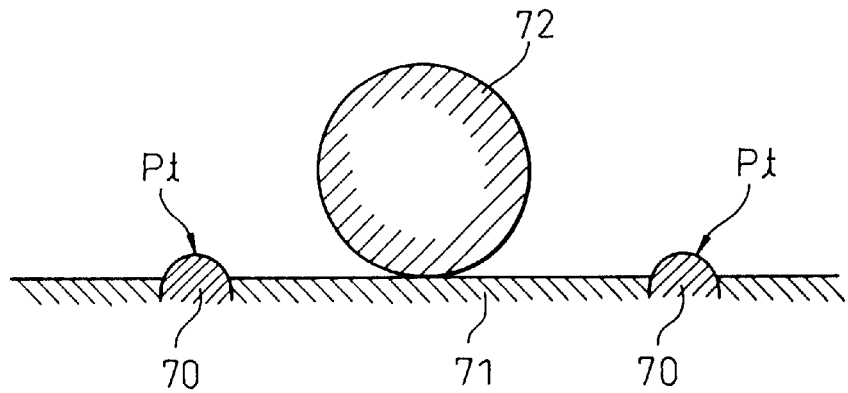
FIGS. 8A to 8C are views for explaining a deposition action of particulate.
Figure 8B:
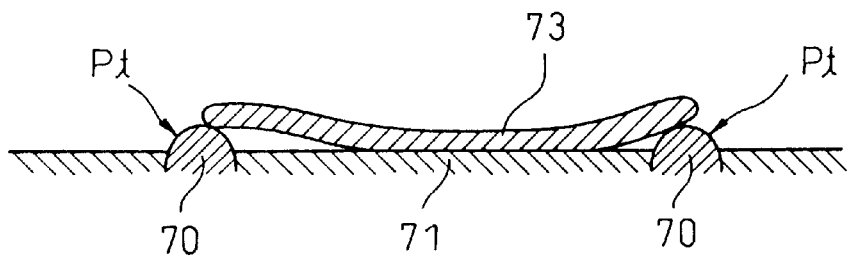
Figure 8C:
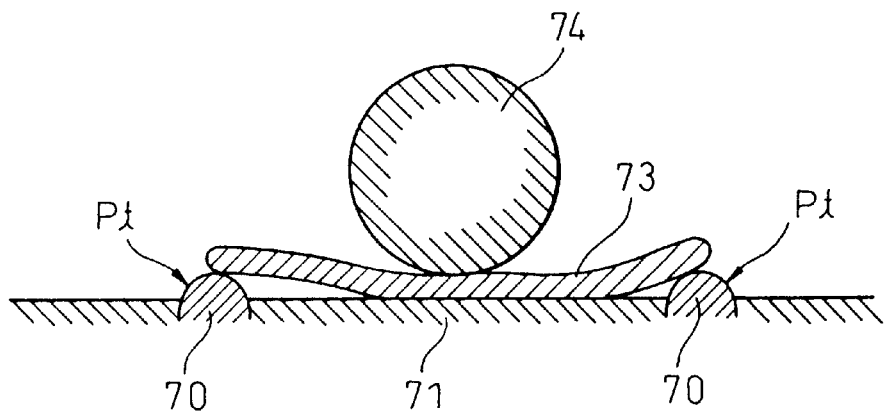

As opposed to this, when the amount M of discharged particulate is larger than the amount G of particulate removable by oxidation, that is, in the region II of FIG. 9, the amount of active oxygen is not sufficient for successive oxidation of all of the particulate. FIGS. 8A to 8C show the state of oxidation of particulate in this case.

That is, when the amount of active oxygen is not sufficient for successive oxidation of all of the particulate, if particulate 72 adheres on the active oxygen release agent 71 as shown in FIG. 8A, only part of the particulate 72 is oxidized. The portion of the particulate not sufficiently oxidized remains on the carrier layer. Next, if the state of an insufficient amount of active oxygen continues, the portions of the particulate not oxidized successively are left on the carrier layer. As a result, as shown in FIG. 8B, the surface of the carrier layer is covered by the residual particulate portion 73.

This residual particulate portion 73 covering the surface of the carrier layer gradually changes to hard-to-oxidize carbon and therefore the residual particulate portion 73 easily remains as it is. Further, if the surface of the carrier layer is covered by the residual particulate portion 73, the action of oxidation of the NO and $SO_2$ by the platinum Pt and the action of release of the active oxygen from the active oxygen release agent 71 are suppressed. As a result, as shown in FIG. 8C, other particulate 74 successively deposits on the residual particulate portion 73. That is, the particulate deposits in layers. If the particulate deposits in layers in this way, the particulate is separated in distance from the platinum Pt or the active oxygen release agent 71, so even if easily oxidizable particulate, it will not be oxidized by active oxygen O. Therefore, other particulate successively deposits on the particulate 74. That is, if the state of the amount M of discharged particulate being larger than the amount G of particulate removable by oxidation continues, particulate deposits in layers on the particulate filter 24 and therefore unless the temperature of the exhaust gas is made higher or the temperature of the particulate filter 24 is made higher, it is no longer possible to cause the deposited particulate to ignite and burn.

In this way, in the region I of FIG. 9, the particulate is burned in a short time without emitting a luminous flame on the particulate filter 24. In the region II of FIG. 9, the particulate deposits in layers on the particulate filter 24. Therefore, to prevent the particulate from depositing in layers on the particulate filter 24, the amount M of discharged particulate has to be kept smaller than the amount G of the particulate removable by oxidation at all times.

As will be understood from FIG. 9, with the particulate filter 24 used in this embodiment of the present invention, the particulate can be oxidized even if the temperature TF of the particulate filter 24 is considerably low. Therefore, in a compression ignition type engine shown in FIG. 1 and FIG. 3, it is possible to maintain the amount M of the discharged particulate and the temperature TF of the particulate filter 24 so that the amount M of discharged particulate normally becomes smaller than the amount G of the particulate removable by oxidation. Therefore, in this embodiment of the present invention, the amount M of discharged particulate and the temperature TF of the particulate filter 24 are maintained so that the amount M of discharged particulate usually becomes smaller than the amount G of the particulate removable by oxidation.

If the amount M of discharged particulate is maintained to be usually smaller than the amount G of particulate removable by oxidation in this way, the particulate no longer deposits in layers on the particulate filter 24. As a result, the pressure loss of the flow of exhaust gas in the particulate filter 24 is maintained at a substantially constant minimum pressure loss to the extent of being able to be said to not change much at all. Therefore, it is possible to maintain the drop in output of the engine at a minimum.

Further, the action of removal of particulate by oxidation of the particulate takes place even at a considerably low temperature. Therefore, the temperature of the particulate filter 24 does not rise that much at all and consequently there is almost no risk of deterioration of the particulate filter 24. Further, since the particulate does not build up at all on the particulate filter 24, there is no danger of coagulation of ash and therefore there is less danger of the particulate filter 24 clogging.

This clogging however occurs mainly due to the calcium sulfate $CaSO_4$. That is, fuel or lubrication oil contains calcium Ca. Therefore, the exhaust gas contains calcium Ca. This calcium Ca produces calcium sulfate $CaSO_4$ in the presence of $SO_3$. This calcium sulfate $CaSO_4$ is a solid and will not break down by heat even at a high temperature. Therefore, if calcium sulfate $CaSO_4$ is produced and the fine holes of the particulate filter 24 are clogged by this calcium sulfate $CaSO_4$, clogging occurs.

In this case, however, if an alkali metal or an alkali earth metal having a higher tendency toward ionization than calcium Ca, for example potassium K, is used as the active oxygen release agent 71, the $SO_3$ diffused in the active oxygen release agent 71 bonds with the potassium K to form potassium sulfate $K_2SO_4$. The calcium Ca passes through the partitions 74 of the particulate filter 24 and flows out into the exhaust gas passages 60 or 61 without bonding with the $SO_3$. Therefore, there is no longer any clogging of fine holes of the particulate filter 24. Accordingly, as described above, it is preferable to use an alkali metal or an alkali earth metal having a higher tendency toward ionization than calcium Ca, that is, potassium K, lithium Li, cesium Cs, rubidium Rb, barium Ba, and strontium Sr, as the active oxygen release agent 71.

Now, in this embodiment of the present invention, the intention is basically to maintain the amount M of the discharged particulate smaller than the amount G of the particulate removable by oxidation in all operating states. In practice, however, it is almost impossible to keep the amount M of discharged particulate lower than the amount G of the particulate removable by oxidation in all operating states. For example, at the time of engine startup, normally the particulate filter 24 is low in temperature, therefore at this time the amount M of discharged particulate becomes greater than the amount G of particulate removable by oxidation. Therefore, in this embodiment of the present invention, except for special cases such as right after engine startup, the amount M of discharged particulate is made to become smaller than the amount G of particulate removable by oxidation.

Note that if the amount M of discharged particulate becomes greater than the amount G of particulate removable by oxidation such as right after engine startup, a portion of the particulate not oxidized starts to remain on the particulate filter 24. When the part of the particulate which failed to be oxidized starts remaining in this way, that is, when the particulate only deposits up to a certain limit, if the amount M of discharged particulate becomes less than the amount G of particulate removable by oxidation, the portion of the residual particulate will be removed by oxidation without emitting a luminous flame due to the active oxygen O. Therefore, in this embodiment of the present invention, at the time of special operating states such as right after engine startup, if the amount M of discharged particulate becomes less than the amount G of particulate removable by oxidation, the amount M of discharged particulate and the temperature TF of the particulate filter 24 are maintained so that only an amount of particulate less than the certain limit which can be removed by oxidation deposits on the particulate filter 24.

Further, sometimes even if it is attempted to maintain the amount M of discharged particulate and the temperature TF of the particulate filter 24 in this way, particulate deposits on layers on the particulate filter 24 due to some reason or another. In such a case as well, if the air-fuel ratio of all or part of the exhaust gas is temporarily made rich, the particulate deposited on the particulate filter 24 will be oxidized without emitting a luminous flame. That is, if the air-fuel ratio of the exhaust gas is made rich, that is, if the concentration of oxygen in the exhaust gas is reduced, the active oxygen O is released all at once from the active oxygen release agent 71 to the outside. The particulate deposited can be removed by oxygen in a short time without emitting a luminous flame by the active oxygen O released all at once in this way.

Now, as explained above, in this embodiment of the present invention, a layer of a carrier comprised of for example alumina is formed on the two side surfaces of the partition walls 64 and the inner wall surfaces of the fine holes in the partition walls 64 of the particulate filter 24. A precious metal catalyst and active oxygen release agent are carried on the carrier. In this embodiment of the present invention, the carrier carries the precious metal and an $NO_x$ absorbent which absorbs $NO_x$ contained in the exhaust gas when the air-fuel ratio of the exhaust gas flowing into the particulate filter 24 is lean and which releases the $NO_x$ when the air-fuel ratio of the exhaust gas flowing into the particulate filter 24 becomes the stoichiometric air-fuel ratio or rich.

In this embodiment of the present invention, platinum Pt is used as the precious metal. As the $NO_x$ absorbent, use is made of at least one of an alkali metal such as potassium K, sodium Na, lithium Li, cesium Cs, and rubidium Rb, an alkali earth metal such as barium Ba, calcium Ca, and strontium Sr, and a rare earth such as lanthanum La and yttrium Y. Note that as will be understood from a comparison with the metal comprising the above active oxygen release agent, the metals comprising the $NO_x$ absorbent and the metals comprising the active oxygen release agent match in large part.

In this case, it is possible to use different metals for the $NO_x$ absorbent and active oxygen release agent or possible to use the same metal. When using the same metal for the $NO_x$ absorbent and the active oxygen release agent, the functions of both the function of the $NO_x$ absorbent and the function of the active oxygen release agent described above are simultaneously achieved.

Next, an explanation will be made of the action of absorption and release of $NO_x$ taking as an example the case of using platinum Pt as the precious metal catalyst and using potassium K as the $NO_x$ absorbent.

First, when the $NO_x$ absorption action is studied, $NO_x$ is absorbed in the $NO_x$ absorbent by the same mechanism as the mechanism shown in FIG. 7A. In this case, however, in FIG. 7A, reference numeral 71 indicates an $NO_x$ absorbent.

That is, when the air-fuel ratio of the exhaust gas flowing into the particulate filter 24 is lean, since a large amount of excess oxygen is contained in the exhaust gas, if the exhaust gas flows into the exhaust gas inflow passage 60 of the particulate filter 24, as shown in FIG. 7A, the oxygen $O_2$ adheres on the surface of the platinum Pt in the form of $O_2^-$ or $O^{2-}$. On the other hand, the NO in the exhaust gas reacts with the $O_2^-$ or $O^{2-}$ on the surface of the platinum Pt and becomes $NO_2$ ($2NO+O_2 \rightarrow 2NO_2$). Next, part of the $NO_2$ produced is absorbed in the $NO_x$ absorbent 71 while being oxidized on the platinum Pt and diffuses in the $NO_x$ absorbent 71 in the form of nitrate ions $NO_3^-$ as shown in FIG. 7A while bonding with the potassium K. Part of the nitrate ions $NO_3^-$ produces potassium nitrate $KNO_3$. In this way, NO is absorbed in the $NO_x$ absorbent 71.

On the other hand, if the exhaust gas flowing into the particulate filter 24 becomes rich, the nitrate ions $NO_3^-$ break down into oxygen O and NO. The NO is successively released from the $NO_x$ absorbent 71. Therefore, if the air-fuel ratio of the exhaust gas flowing into the particulate filter 24 becomes rich, NO is released from the $NO_x$ absorbent 71 in a short time. Further, since the NO released is reduced, NO is never exhausted into the atmosphere.

Note that in this case, even if the air-fuel ratio of the exhaust gas flowing into the particulate filter 24 is made the stoichiometric air-fuel ratio, NO is released from the $NO_x$ absorbent 71. In this case, however, since the NO is released only gradually from the $NO_x$ absorbent 71, it takes a somewhat long time for all of the $NO_x$ absorbed in the $NO_x$ absorbent 71 to be released.

As explained above, however, it is possible to use different metals for the $NO_x$ absorbent and active oxygen release agent. In this embodiment of the present invention, however, the same metal is used for the $NO_x$ absorbent and the active oxygen release agent. In this case, as mentioned above, the functions of both the function of the $NO_x$ absorbent and the function of the active oxygen release agent described above are simultaneously achieved. An agent which simultaneously achieves both these functions is referred to below as an active oxygen release agent/$NO_x$ absorbent. In this case, reference numeral 71 in FIG. 7A shows the active oxygen release agent/$NO_x$ absorbent.

When using such an active oxygen release agent/$NO_x$ absorbent 71, when the air-fuel ratio of the exhaust gas flowing into the particulate filter 24 is lean, the NO contained in the exhaust gas is absorbed in the active oxygen release agent/$NO_x$ absorbent 71. When the particulate contained in the exhaust gas adheres to the active oxygen release agent/$NO_x$ absorbent 71, the particulate can be removed by oxidation in a short time by the active oxygen etc. released from the active oxygen release agent/$NO_x$ absorbent 71. Therefore, it is possible to prevent both the particulate and $NO_x$ in the exhaust gas from being exhausted into the atmosphere at this time.

On the other hand, if the air-fuel ratio of the exhaust gas flowing into the particulate filter 24 becomes rich, NO is released from the active oxygen release agent/$NO_x$ absorbent 71. This NO is reduced by the unburned hydrocarbons and carbon monoxide. Therefore, at this time, NO is never exhausted into the atmosphere. Further, if particulate has deposited on the particulate filter 24 at this time, the particulate can be removed by oxidation without emitting a luminous flame by the active oxygen of the active oxygen release agent/$NO_x$ absorbent 71.

The action of release of active oxygen from the active oxygen release agent 71 as already explained with reference to FIG. 9 is started when the temperature of the particulate filter 24 is considerably low. The same is true when using this active oxygen release agent/$NO_x$ absorbent 71. As opposed to this, the action of absorption of $NO_x$ to the $NO_x$ absorbent or the active oxygen release agent/$NO_x$ absorbent 71 is not started until the temperature TF of the particulate filter 24 becomes higher than the temperature of the start of release of the active oxygen. This is believed to be due to the fact that release of active oxygen occurs by stripping oxygen from for example the potassium nitrate $KNO_3$, while the action of absorption of $NO_x$ does not start unless the platinum Pt is activated.

Figure 10:
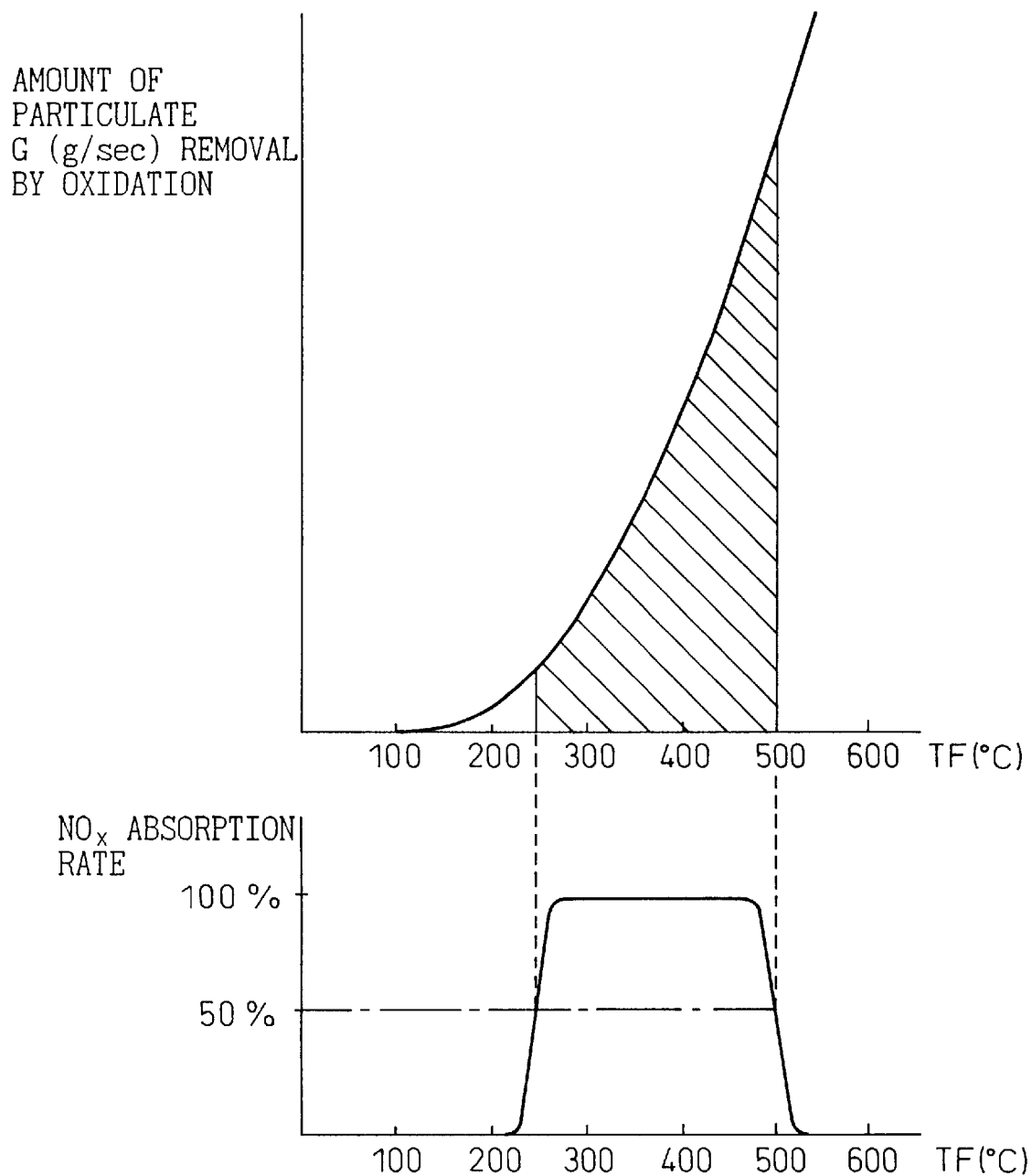
FIG. 10 is a view of a particulate and $NO_x$ simultaneous processing region.

FIG. 10 shows the amount G of particulate removable by oxidation and the $NO_x$ absorption rate when using potassium K as the $NO_x$ absorbent or the active oxygen release agent/$NO_x$ absorbent 71. From FIG. 10, the action of release of active oxygen starts when the temperature TF of the particulate filter 24 is less than 200° C., while the active of absorption of $NO_x$ does not start until the temperature TF of the particulate filter 24 is over 200° C.

On the other hand, the action of release of active oxygen becomes greater the higher the temperature TF of the particulate filter 24. As opposed to this, the action of absorption of $NO_x$ disappears when the temperature TF of the particulate filter 24 rises. That is, when the temperature TF of the particulate filter 24 exceeds a certain temperature, in the example shown in FIG. 10, over about 500° C. the nitrate ions $NO_3^-$ or potassium nitrate $KNO_3$ is decomposed due to the heat and NO is released from the active oxygen release agent/$NO_x$ absorbent 71. When this state occurs, the amount of release of NO becomes greater than the amount of absorption of $NO_x$ and therefore the $NO_x$ absorption rate falls as shown in FIG. 10.

FIG. 10 shows the $NO_x$ absorption rate when using potassium K as the active oxygen release agent/$NO_x$ absorbent 71. In this case, the temperature range of the particulate filter 24 where the $NO_x$ absorption rate becomes higher differs depending on the metal used. For example, when using barium Ba as the $NO_x$ absorbent or active oxygen release agent/$NO_x$ absorbent 71, the temperature range of the particulate filter 24 where the $NO_x$ absorption rate becomes higher becomes narrower than when using potassium K shown in FIG. 10.

As explained above, however, it is necessary to make the amount M of discharged particulate smaller than the amount G of particulate removable by oxidation in order to get the particulate in the exhaust gas removed by oxidation without depositing in layers on the particulate filter 24. However, with just reducing the amount M of discharged particulate from the amount G of particulate removable by oxidation, there is no action of absorbing $NO_x$ by the $NO_x$ absorbent or active oxygen release agent/$NO_x$ absorbent 71. To ensure the action of absorbing $NO_x$ of the $NO_x$ absorbent or active oxygen release agent/$NO_x$ absorbent 71, it is necessary to maintain the temperature TF of the particulate filter 24 within the temperature range where the action of absorbing $NO_x$ is performed. In this case, the temperature range of the particulate filter 24 where the action of absorbing $NO_x$ is performed has to be made the temperature range where the $NO_x$ absorption rate is more than a certain value, for example, more than 50 percent. Therefore, when using potassium K as the $NO_x$ absorbent or active oxygen release agent/$NO_x$ absorbent 71, as will be understood from FIG. 10, it is necessary to maintain the temperature TF of the particulate filter 24 between about 250° C. to 500° C.

Therefore, in this embodiment of the present invention, to enable the particulate in the exhaust gas to be removed by oxidation without depositing on the particulate filter 24 and to absorb the $NO_x$ in the exhaust gas, normally the amount M of discharged particulate is maintained to be smaller than the amount G of particulate removable by oxidation and the temperature TF of the particulate filter 24 is maintained within the temperature range where the $NO_x$ absorption rate of the particulate filter 24 becomes more than a certain value. That is, the amount M of discharged particulate and the temperature TF of the particulate filter 24 are maintained within the particulate/$NO_x$ simultaneous processing region shown by the hatching in FIG. 10.

Next, a first embodiment using a variable speed transmission as the transmission 35 will be explained with reference to FIG. 11 and FIG. 12.

Figure 11:
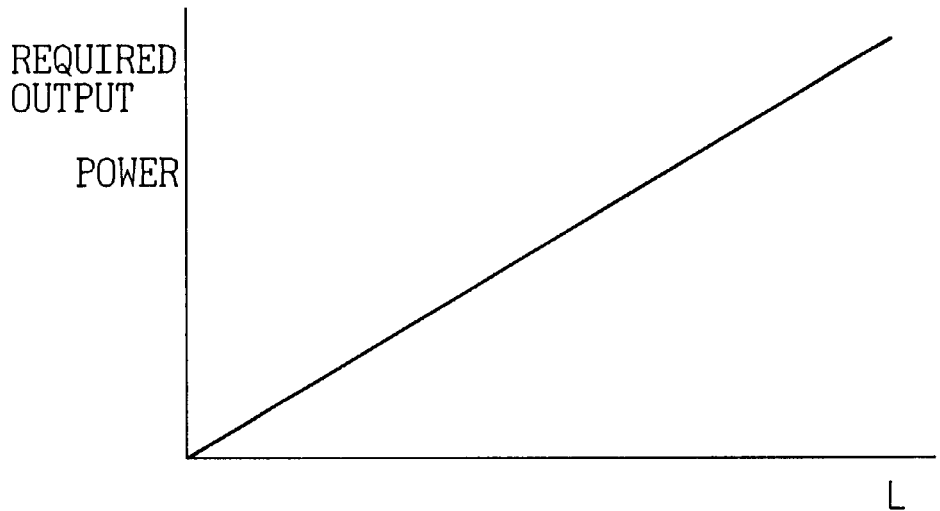
FIG. 11 is a view of a required torque.

FIG. 11 shows the relationship between the required output POWER for the engine and the amount of depression L of the accelerator pedal 44. As will be understood from FIG. 11, the required output POWER increases the greater the amount of depression L of the accelerator pedal 44.

Figure 12:
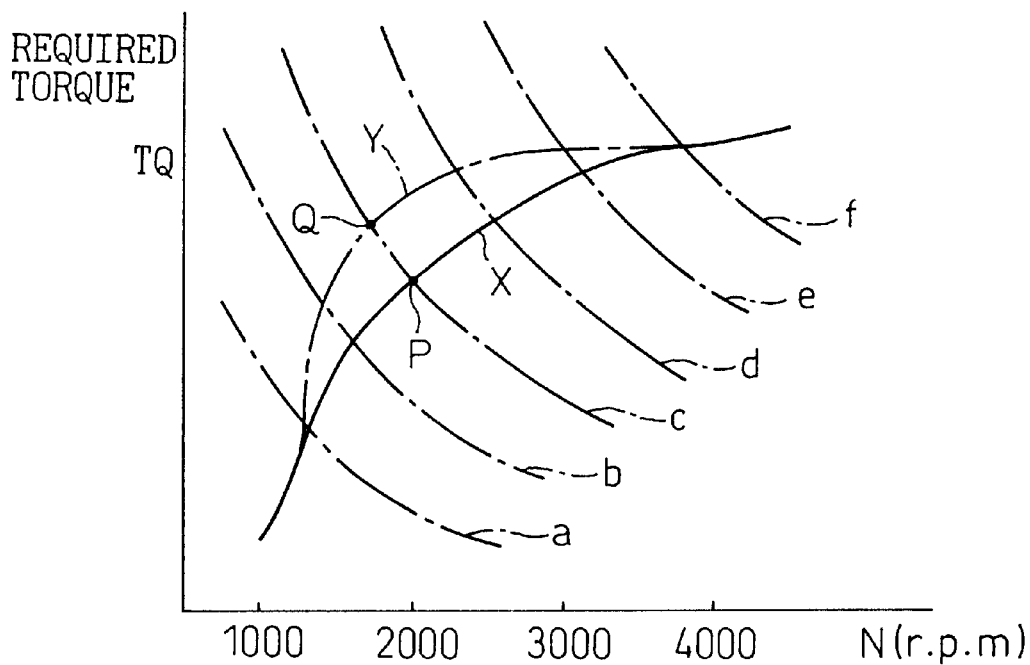
FIG. 12 is a view of engine control lines.

FIG. 12 shows the relationships between the engine control lines, the required output and the engine rotational speed N, the required torque TQ. The required output is the product of the required torque Q and the engine rotational speed N, so the equivalent required output lines a to f of the same required outputs are expressed by the curves as shown in FIG. 12. The required output becomes higher from a to f.

On the other hand, the engine control lines are comprised of a first control line X and a second control line Y of the high torque side and low speed side from the first control line X with respect to the same required output. In the first embodiment, the required torque TQ of the engine and the engine rotational speed N are controlled to the values on the first control line X or the second control line Y in accordance with the required output. Specifically, if for example the required output corresponds to the required output line c, when using the first control line X as the engine control line, the amount of fuel injection is controlled so as to obtain the required torque TQ expressed by the point P, while the gear ratio of the variable speed transmission 35 is controlled so that the engine rotational speed N becomes the engine rotational speed expressed by the point P. As a result, the engine generates a torque expressed by the point P, while the engine rotational speed N is controlled to the rotational speed expressed by the point P.

As opposed to this, when the second control line Y is used as the engine control line, the amount of fuel injection is controlled so as to obtain the required torque TQ expressed by the point Q, while the gear ratio of the variable speed transmission 35 is controlled so that the engine rotational speed N becomes the engine rotational speed expressed by the point Q. As a result, the engine generates a torque expressed by the point Q, while the engine rotational speed N is controlled to the rotational speed expressed by the point Q.

That is, the required torque TQ and the engine rotational speed N of the engine are controlled to values of the first control line X or the second control line Y in accordance with the required output. In this case, as a separate embodiment, it is also possible to variably control the required torque TQ of the engine and the engine rotational speed N in accordance with the temperature of the particulate filter 24 between the first control line X and the second control line Y. Note that the amount of fuel injection is substantially proportional to the required torque TQ, so the ordinate of FIG. 12 may be considered the amount of fuel injection.

Now, the second control line Y shown in FIG. 12 shows the relationship between the required torque TQ and the engine rotational speed N of the best fuel economy. The compression ignition type internal combustion engine shown in FIG. 1 and FIG. 3, of course, and other direct injection type ignition engines generate a considerably large amount of emission of soot and $NO_x$ if made the best fuel economy required torque TQ and engine rotational speed N, that is, values on the second control line Y.

As opposed to this, with a required torque TQ and engine rotational speed N on the first control line X, the fuel economy becomes worse than with the second control line Y, but the amount of generation of soot and $NO_x$ becomes considerably smaller.

As explained above, when the temperature of the particulate filter 24 is low, the soot, that is, the particulate, is not removed by oxidation on the particulate filter 24 and merely deposits on the particulate filter 24. In this case, if the amount of deposition becomes large, the soot will no longer burn unless the temperature is made high, so the amount of deposition must be made as small as possible. Therefore, in the first embodiment, when the temperature of the particulate filter 24 is low, the required torque TQ and the engine rotational speed N are controlled along the first control line emitting less soot, that is, particulate.

On the other hand, as explained above, when the temperature of the particulate filter 24 is not in a constant temperature range, no $NO_x$ absorption action occurs. Therefore, in this case, the amount of emission of $NO_x$ has to be reduced as much as possible. Therefore, in the first embodiment, when the temperature of the particulate filter 24 is not in the temperature range where the $NO_x$ absorption action is performed, the required torque TQ and the engine rotational speed N are controlled along the first control line X emitting little $NO_x$.

That is, in the first embodiment, when the temperature TF of the particulate filter 24 is not in the temperature range of the particulate and $NO_x$ simultaneous processing region shown by the hatching in FIG. 10, that is, when the degree of activation of the particulate filter 24 with respect to both the oxidation action of the particulate and the absorption action of the $NO_x$ is low, the required torque TQ and the engine rotational speed N are controlled along the first control line X emitting little soot and $NO_x$.

As opposed to this, when the temperature TF of the particulate filter 24 is in the temperature range of the particulate and $NO_x$ simultaneous processing region shown by the hatching in FIG. 10, that is, when the degree of activation of the particulate filter 24 is high, even if the amount of emission of soot and $NO_x$ increases, the soot, that is, the particulate, is removed by oxidation on the particulate filter 24 and the $NO_x$ is absorbed in the particulate filter 24. Therefore, in the first embodiment, when the temperature TF of the particulate filter 24 is in the temperature range of the particulate and $NO_x$ simultaneous processing region shown by the hatching in FIG. 10, the required torque TQ and the engine rotational speed N are controlled along the second control line Y giving the best fuel economy.

On the other hand, as explained above, in this embodiment of the present invention, basically the amount of discharged particulate M is kept smaller than the amount G of particulate removable by oxidation. However, if the required torque TQ and the engine rotational speed N are controlled along the second control line Y, the amount of emission of soot increases, so sometimes the amount of discharged particulate M becomes greater than the amount G of particulate removable by oxidation. In this case, if the state of M>G continues, the particulate deposits on the particulate filter 24 and there is the danger that the particulate can no longer be burned unless the temperature is made high. Therefore, in this embodiment of the present invention, when controlling the engine based on the second control line Y and the particulate deposits by more than a certain extent on the particulate filter 24, the engine is changed from control based on the second control line Y to control based on the first control line X emitting little soot.

Note that in this embodiment of the present invention, when the opening degree SE of the EGR control valve 29 becomes smaller than the lower limit (SEO-α) smaller by exactly a predetermined value α from the predicted reference opening degree SEO, it is judged that particulate has deposited by more than a certain extent on the particulate filter 24. That is, if particulate begins depositing on the particulate filter 24, the pressure in the exhaust pipe 26 upstream of the particulate filter 24 rises and as a result the amount of EGR gas supplied into the intake duct 17 increases. If the amount of EGR gas increases, the amount of intake air GA falls, so the opening degree of the EGR control valve 29 becomes smaller so as to maintain the amount of intake air GA at the target intake air amount GAO. Therefore, it can be judged that the particulate has deposited to a certain extent on the particulate filter 24 from the fact that the opening degree SE of the EGR control valve 29 becomes smaller than the lower limit (SEO-α).

Next, the control routine of the changeover flag set when the engine is to be controlled along with the second control line Y will be explained with reference to FIG. 13.

Figure 13:
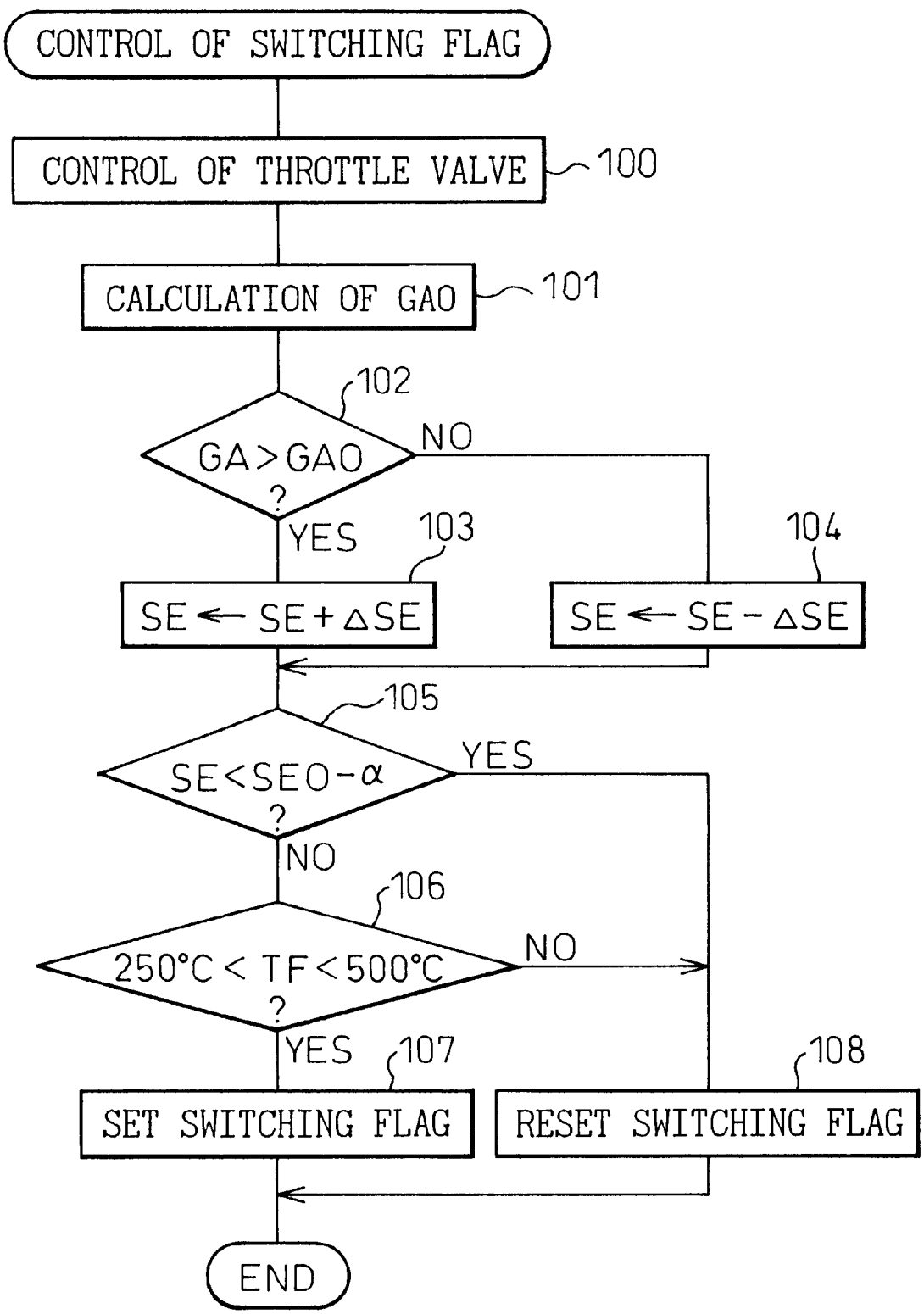
FIG. 13 is a flow chart of the control of a changeover flag.

Referring to FIG. 13, first, at step 100, the opening degree of the throttle valve 21 is controlled to the target opening degree ST shown in FIG. 4B. Next, at step 101, the target intake air amount GAO is calculated from the map shown in FIG. 4A. Next, at step 102, it is judged if the intake air amount GA detected by the air flowmeter 18 is larger than the target intake air amount GAO. When GA>GAO, at step 103, a constant value ΔSE is added to the opening degree SE of the EGR control valve 29, then the routine proceeds to step 105. As opposed to this, when GA≦GAO, the routine proceeds to step 104, where the constant value ΔSE is subtracted from the opening degree SE of the EGR control valve 29, then the routine proceeds to step 105. That is, the opening degree SE of the EGR control valve 29 is controlled so that GA=GAO.

Next, at step 105, it is judged if the opening degree SE of the EGR control valve 29 has become smaller than the lower limit (SEO-α). When SE<SEO-α, the routine proceeds to step 108, where the changeover flag is reset. As opposed to this, when SE≧SEO-α, the routine proceeds to step 106, where it is judged if the temperature TF of the particulate filter 24 detected by the temperature sensor 43 is between 250° C. and 500° C. When TF≦250° C. or TF≧500° C., the routine proceeds to step 108, where the changeover flag is reset. As opposed to this, when 250° C.<TF<500° C., the routine proceeds to step 107, where the changeover flag is set. That is, when SE≧SEO-α and 250° C.<TF<500° C., the changeover flag is set.

Next, a routine for operational control will be explained with reference to FIG. 14.

Figure 14:
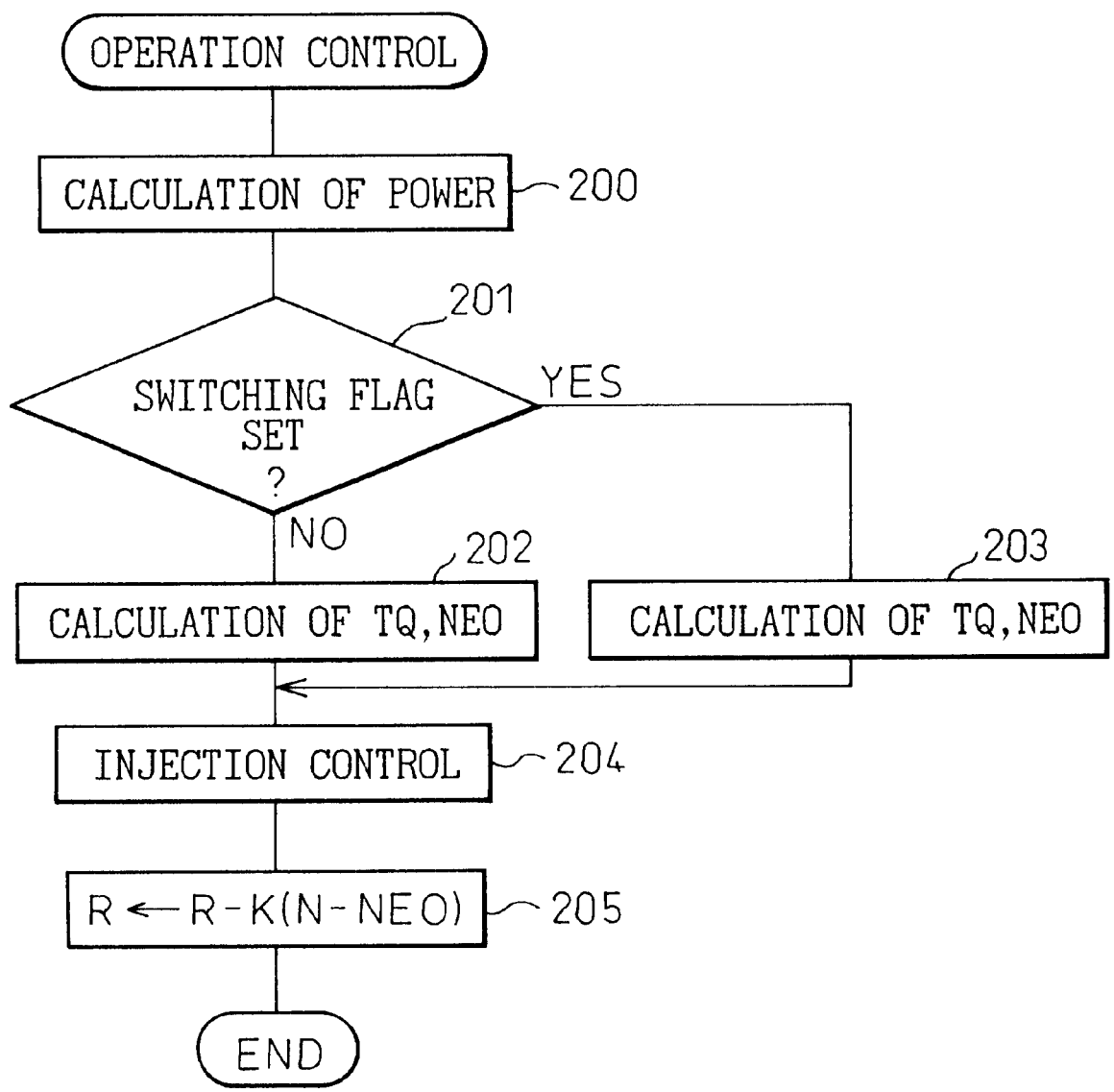
FIG. 14 is a flow chart of operational control.

Referring to FIG. 14, first, at step 200, the required output POWER is calculated from the relationship shown in FIG. 11. Next, at step 201, it is judged if the changeover flag has been set. When the changeover flag has been reset, the routine proceeds to step 202, where the required torque TQ and engine rotational speed NEO on the first control line X are calculated in accordance with the required output POWER from the relationship shown in FIG. 12, then the routine proceeds to step 204. As opposed to this, when the changeover flag is set, the routine proceeds to step 203, where the required torque TQ and engine rotational speed NEO on the second control line Y are calculated in accordance with the required output POWER from the relationship shown in FIG. 12, then the routine proceeds to step 204.

At step 204, the amount of fuel injection is calculated from the required torque TQ calculated and the fuel is injected based on the amount of fuel injection calculated. Next, at step 205, the gear ratio R (input rotational speed/output rotational speed) of the transmission 35 is calculated from the following formula based on the calculated engine rotational speed NEO and the actual engine rotational speed N:

$$R \leftarrow R - K(N-NEO)$$

Here, K is a constant. That is, the gear ratio R of the transmission 35 is controlled by proportional integration so that the engine rotational speed N becomes the engine rotational speed NEO on the first control line X or the second control line Y in accordance with the required output POWER.

Next, an explanation will be given of a second embodiment with reference to FIG. 15 and FIG. 16 using as a transmission 35 an ordinary automatic transmission provided with a torque converter, an automatic transmission of a type enabling automatic clutch operation and gear changing operation in a manual transmission provided with a clutch, etc.

Figure 15:
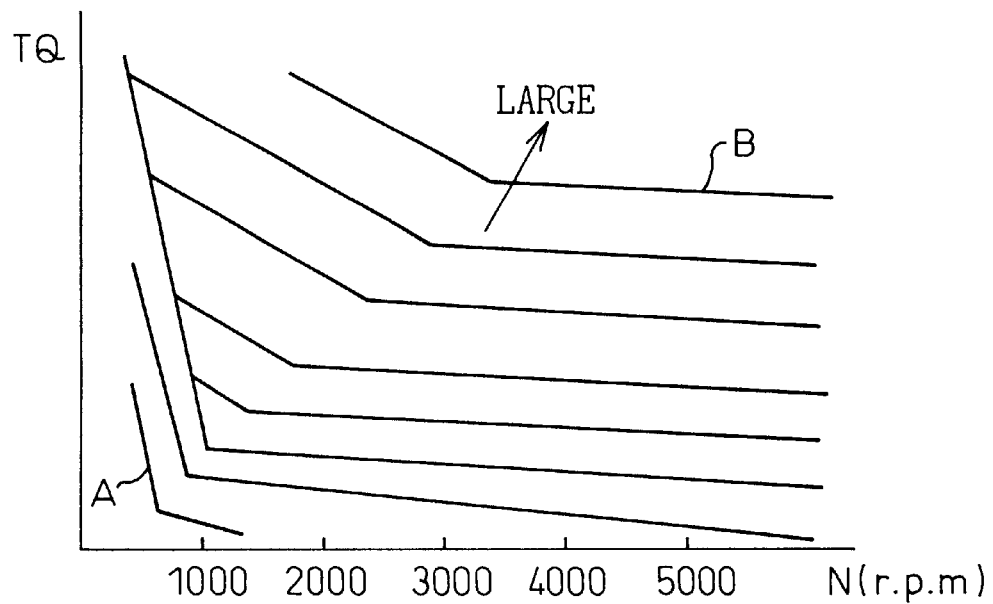
FIG. 15 is a view of the required torque.

First, referring to FIG. 15, the ordinate TQ shows the required torque of the engine, while the abscissa N shows the engine rotational speed. The solid lines show the relationship between the required torque TQ and the engine rotational speed N at the same amount of depression of the accelerator pedal 44. Further, the solid line A in FIG. 15 shows when the amount of depression of the accelerator pedal 44 is zero, while the solid line B shows when the amount of depression of the accelerator pedal 44 is maximum. The amount of depression of the accelerator pedal 44 increases from the solid line A to the solid line B. In the second embodiment, the required torque TQ is calculated based on the relationship shown in FIG. 15 in accordance with the amount of depression of the accelerator pedal 44.

Figure 16:
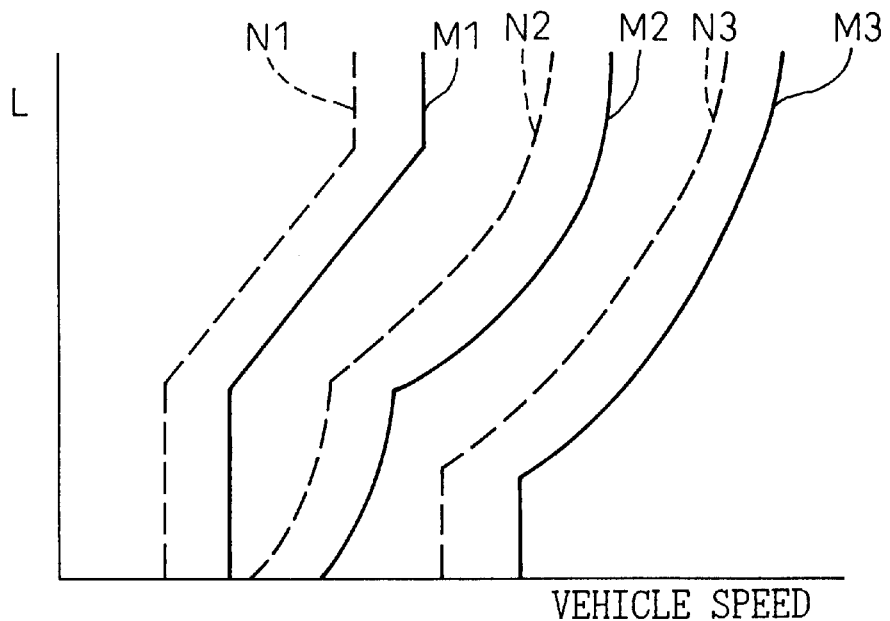
FIG. 16 is a view of gear boundary lines.

On the other hand, the ordinate L of FIG. 16 shows the amount of depression of the accelerator pedal 44, which is a value representative of the required output. The abscissa shows the output rotational speed of the transmission 35, that is, the vehicle speed. M1, M2, and M3 show first gear boundary lines, while N1, N2, and N3 show second gear boundary lines. Speaking of the first gear boundary lines, the low speed side from M1 is the low gear region. There is a second gear region between M1 and M2, a third gear region between M2 and M3, and a top gear region at the high speed side of M3. Therefore, the second gear boundary lines N1, N2, and N3 are positioned at the low speed side from the first gear boundary lines M1, M2, and M3.

In the second embodiment, when the changeover flag, controlled in FIG. 13, is reset, the gear boundary lines of the transmission 35 are made the first gear boundary lines M1, M2, and M3. When the changeover flag is set, the gear boundary lines of the transmission 35 are made the second gear boundary lines N1, N2, and N3. In the second embodiment, the first gear boundary lines M1, M2 and M3 are set so that the operating state of the engine becomes somewhat poor in fuel economy, but the amount of emission of soot and $NO_x$ becomes small.

On the other hand, if the gear boundary lines are changed to the second gear boundary lines N1, N2, and N3, compared with the first gear boundary lines M1, M2, and M3, the engine rotational speed N becomes low and the required torque TQ becomes larger between N1 and M1, between N2 and M2, and between N3 and M3. That is, the distances between N1 and M1, between N2 and M2, and between N3 and M3 correspond to the change from the first control line X to the second control line Y. Therefore, if the gear boundary lines are changed from the first gear boundary lines M1, M2, and M3 to the second gear boundary lines N1, N2, and N3, the amount of emission of soot and $NO_x$ increases, but the fuel economy becomes good.

Figure 17:
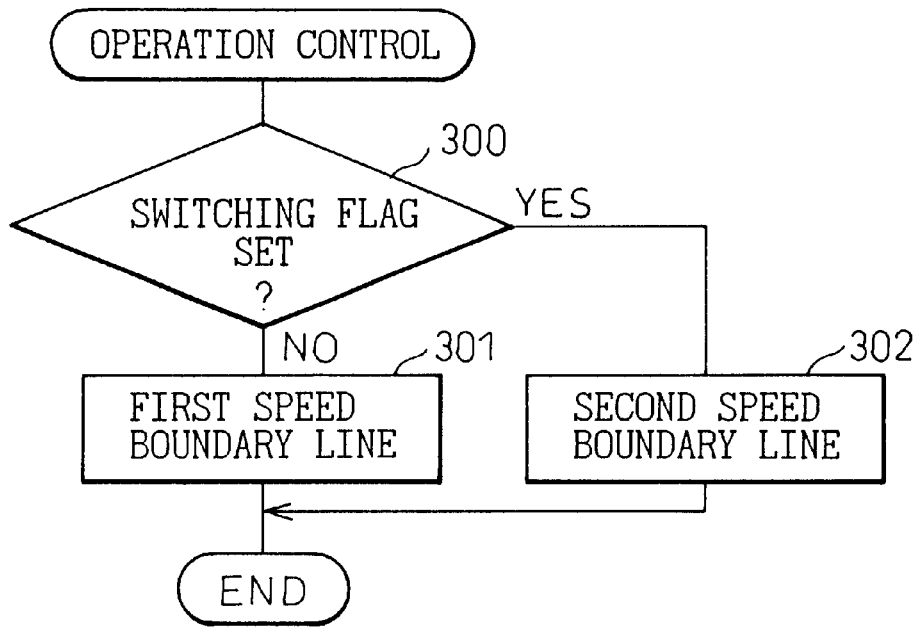
FIG. 17 is a flow chart of operational control.

FIG. 17 shows the routine for operational control of the second embodiment.

Referring to FIG. 17, first, at step 300, it is judged if the changeover flag has been set. When the changeover flag is reset, the routine proceeds to step 301, where the gear boundary lines are made the first gear boundary lines M1, M2, and M3. When the changeover flag is set, the routine proceeds to step 302, where the gear boundary lines are made the second gear boundary lines N1, N2, and N3.

Next, as explained above, in this embodiment of the present invention, $NO_x$ is absorbed in the $NO_x$ absorbent 71 or the active oxygen release agent/$NO_x$ absorbent 71 (hereinafter these being called together as simply the $NO_x$ absorbent 71). There is however a limit to the $NO_x$ absorbing capability of the $NO_x$ absorbent 71. It is necessary to cause the release of $NO_x$ from the $NO_x$ absorbent 71 before the $NO_x$ absorbing capability of the $NO_x$ absorbent 71 becomes saturated. Therefore, it is necessary to estimate the amount of $NO_x$ absorbed in the $NO_x$ absorbent 71. Accordingly, in this embodiment of the present invention, the amount A of $NO_x$ absorption per unit time is found in advance in the form of a map as a function of the required torque TQ and the engine rotational speed N as shown in FIG. 1 and the $NO_x$ amount $\Sigma NOX$ absorbed in the $NO_x$ absorbent 71 is estimated by cumulatively adding the amount A of $NO_x$ absorption per unit time.

Further, in this embodiment of the present invention, when the $NO_x$ absorption $\Sigma NOX$ exceeds the predetermined allowable maximum value MAXN, the air-fuel ratio of the exhaust gas flowing into the $NO_x$ absorbent 71 is made temporarily rich and thereby the $NO_x$ is made to be released from the $NO_x$ absorbent 71.

Note that the exhaust gas includes $SO_x$. The $NO_x$ absorbent 71 absorbs not only $NO_x$, but also $SO_x$. The mechanism of absorption of $SO_x$ in the $NO_x$ absorbent is considered to be the same as the mechanism of absorption of $NO_x$.

That is, explaining this taking as an example the case of carrying platinum Pt and potassium K on the carrier in the same way as the explanation of the mechanism of absorption of $NO_x$, as explained above, when the air-fuel ratio of the exhaust gas is lean, the oxygen $O_2$ adheres to the surface of the platinum Pt in the form of $O_2^-$ or $O^{2-}$. The $SO_2$ in the exhaust gas reacts with the $O_2^-$ or $O^{2-}$ on the surface of the platinum Pt to become $SO_3$. Next, part of the $SO_3$ which is produced is absorbed in the $NO_x$ absorbent while being oxidized on the platinum Pt and diffuses in the $NO_x$ absorbent in the form of sulfate ions $SO_4^{2-}$ while bonding with the potassium K to produce potassium sulfate $K_2SO_4$.

This potassium sulfate $K_2SO_4$, however, is stable and resistant to decomposition. As explained above, even if the air-fuel ratio of the exhaust gas is made rich, the potassium sulfate $K_2SO_4$ remains as it is without decomposing. Therefore, the potassium sulfate $K_2SO_4$ increases in the $NO_x$ absorbent 71 along with the elapse of time and consequently the amount of $NO_x$ which can be absorbed by the $NO_x$ absorbent 71 falls along with the elapse of time.

This potassium sulfate $K_2SO_4$, however, decomposes when the temperature of the $NO_x$ absorbent 71 exceeds a certain temperature set by the $NO_x$ absorbent 71, for example, about 600° C. If the air-fuel ratio of the exhaust gas flowing into the $NO_x$ absorbent 71 at that time is made rich, $SO_x$ is released from the $NO_x$ absorbent 71. Releasing the $SO_x$ from the $NO_x$ absorbent 71, however, requires a considerably long time compared with releasing $NO_x$ from the $NO_x$ absorbent 71.

Therefore, in this embodiment of the present invention, when $SO_x$ is to be released from the $NO_x$ absorbent, a hydrocarbon, for example, fuel, is injected from the hydrocarbon feed valve 42 so that the air-fuel ratio of the exhaust gas becomes rich. If fuel is injected from the hydrocarbon feed valve 42, the temperature of the $NO_x$ absorbent 71 rises due to the heat of combustion of the fuel and therefore $SO_x$ is released from the $NO_x$ absorbent 71.

Next, an explanation will be given of the processing routine of $NO_x$ release flag set when $NO_x$ is to be released from the $NO_x$ absorbent 71 and the $SO_x$ release flag set when $SO_x$ is to be released from the $NO_x$ absorbent 71 while referring to FIG. 19. Note that this routine is executed by interruption every predetermined period.

Figure 18:
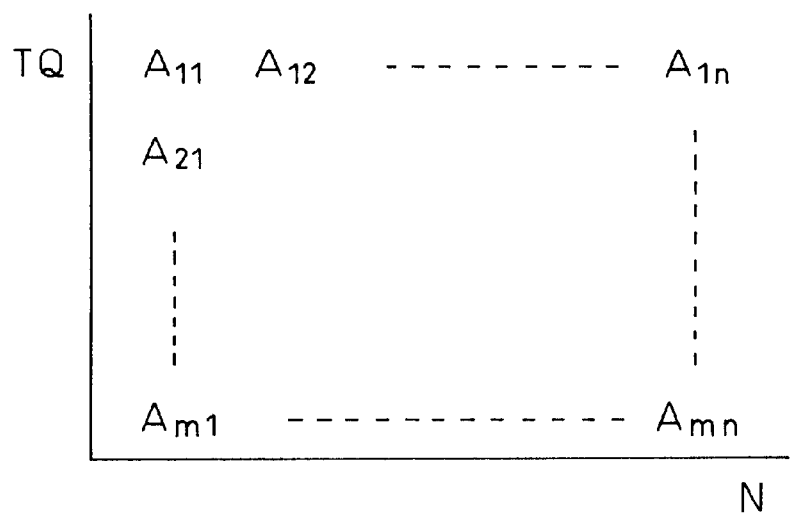
FIG. 18 is a view of a map of the amount of $NO_x$ absorption.
Figure 19:
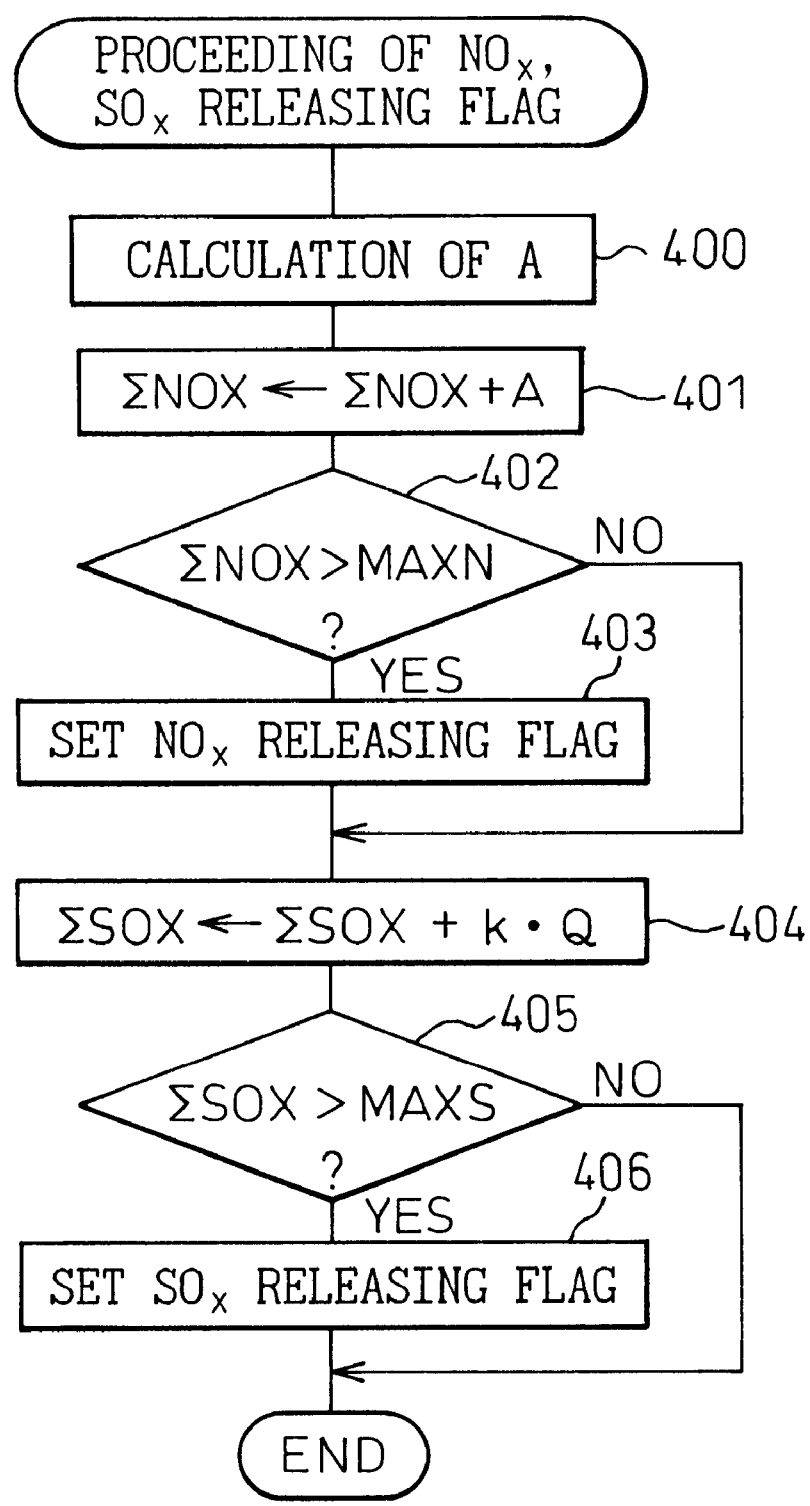
FIG. 19 is a flow chart of processing for $NO_x$ and $SO_x$ release flags.

Referring to FIG. 19, first, at step 400, the amount A of $NO_x$ absorption per unit time is calculated from the map shown in FIG. 18. Next, at step 401, A is added to the $NO_x$ absorption $\Sigma NOX$. Next, at step 402, it is judged if the $NO_x$ absorption $\Sigma NOX$ has exceeded the allowable maximum MAXN. When $\Sigma NOX < MAXN$, the routine proceeds to step 403, where the $NO_x$ release flag showing that $NO_x$ is to be released is set. Next, the routine proceeds to step 404.

At step 404, the product k·Q of the constant k multiplied with the injection amount Q is added to $\Sigma SOX$. The fuel contains a substantially constant amount of sulfur S. Therefore, the amount of $SO_x$ absorbed in the $NO_x$ absorbent 71 can be expressed by k·Q. Therefore, the $\Sigma SOX$ obtained by successively adding this k·Q expresses the amount of $SO_x$ estimated as being absorbed in the $NO_x$ absorbent 71. At step 405, it is judged if this $SO_x$ amount $\Sigma SOX$ exceeds the allowable maximum MAXS. When $\Sigma SOX > MAXS$, the routine proceeds to step 406, where the $SO_x$ release flag is set.

Next, the processing routine for release of $NO_x$ and $SO_x$ will be explained with reference to FIG. 20.

Figure 20:
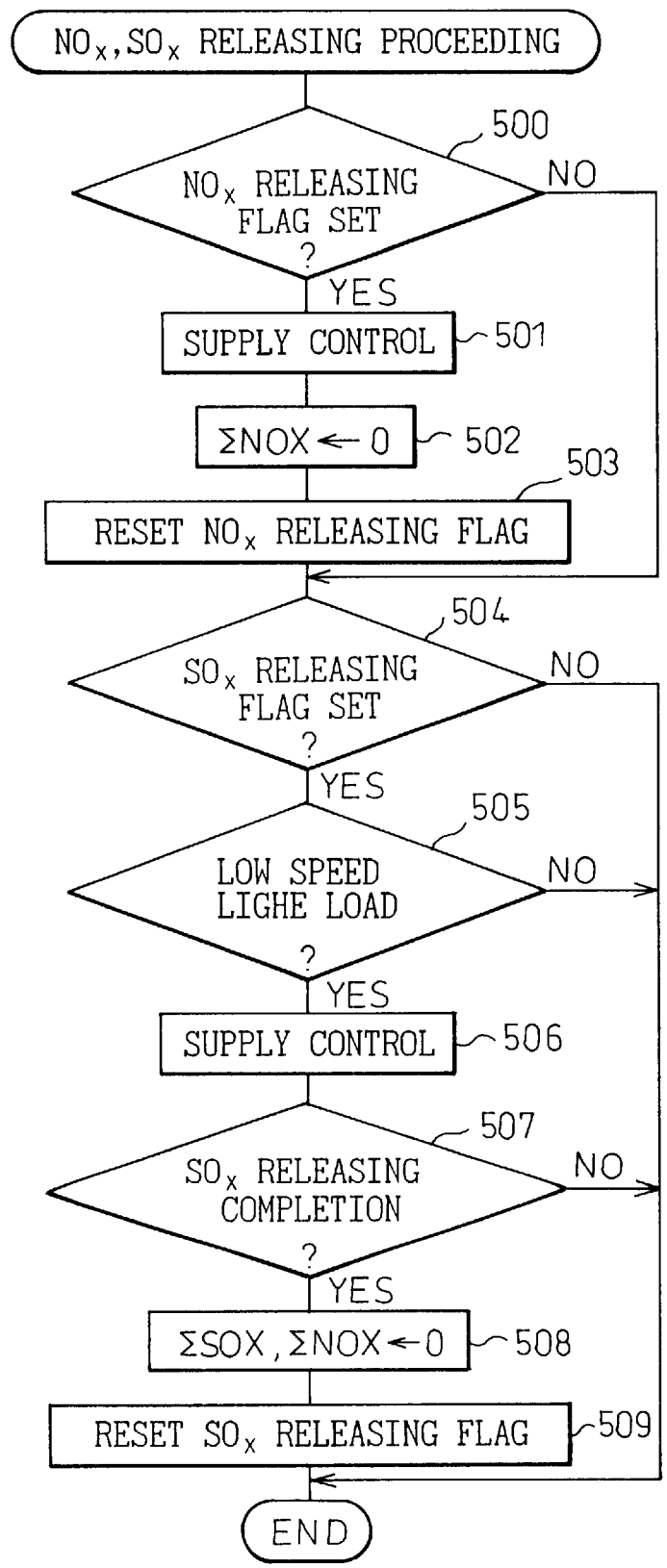
FIG. 20 is a flow chart of processing for release of $NO_x$ and $SO_x$.

Referring to FIG. 20, first, at step 500, it is judged if the $NO_x$ release flag has been set or not. When the $NO_x$ release flag has been set, the routine proceeds to step 501, where the fuel is supplied from the hydrocarbon feed valve 42 for a predetermined time so that the air-fuel ratio of the exhaust gas becomes rich. At this time, $NO_x$ is released from the $NO_x$ absorbent 71. Next, at step 502, $\Sigma NOX$ is cleared, then at step 503, the $NO_x$ release flag is reset.

Next, at step 504, it is judged if the $SO_x$ release flag has been set. When the $SO_x$ release flag has been set, the routine proceeds to step 505, where it is judged if the engine is in low speed low load operation. When in low speed low load operation, the routine proceeds to step 506, where fuel is supplied from the hydrocarbon feed valve 42 over a longer period than at the time of release of $NO_x$ so that the air-fuel ratio of the exhaust gas becomes rich. The amount of fuel necessary for making the air-fuel ratio of the exhaust gas rich becomes smaller the lower the engine rotational speed and becomes smaller than lower the engine load. Therefore, at the time of engine low speed low load operation, the fuel is supplied from the hydrocarbon feed valve 42.

Next, at step 507, it is judged if the release of the $SO_x$ from the $NO_x$ absorbent 71 has been completed. When it is judged that the release of the $SO_x$ has been completed, the routine proceeds to step 508, where the $\Sigma SOX$ and $\Sigma NOX$ are cleared, then the $SO_x$ release flag is reset at step 509.

Next, an explanation will be made of the control of the operation at the time of engine acceleration and deceleration. In this embodiment of the present invention, the electric motor 37 is driven at the time of acceleration so as to obtain a good acceleration operation even at the time of acceleration in an operating region where the exhaust turbocharger 15 does not operate. On the other hand, at the time of deceleration, the electric motor 37 is operated as a generator and the generated electric power is stored.

Figure 21:
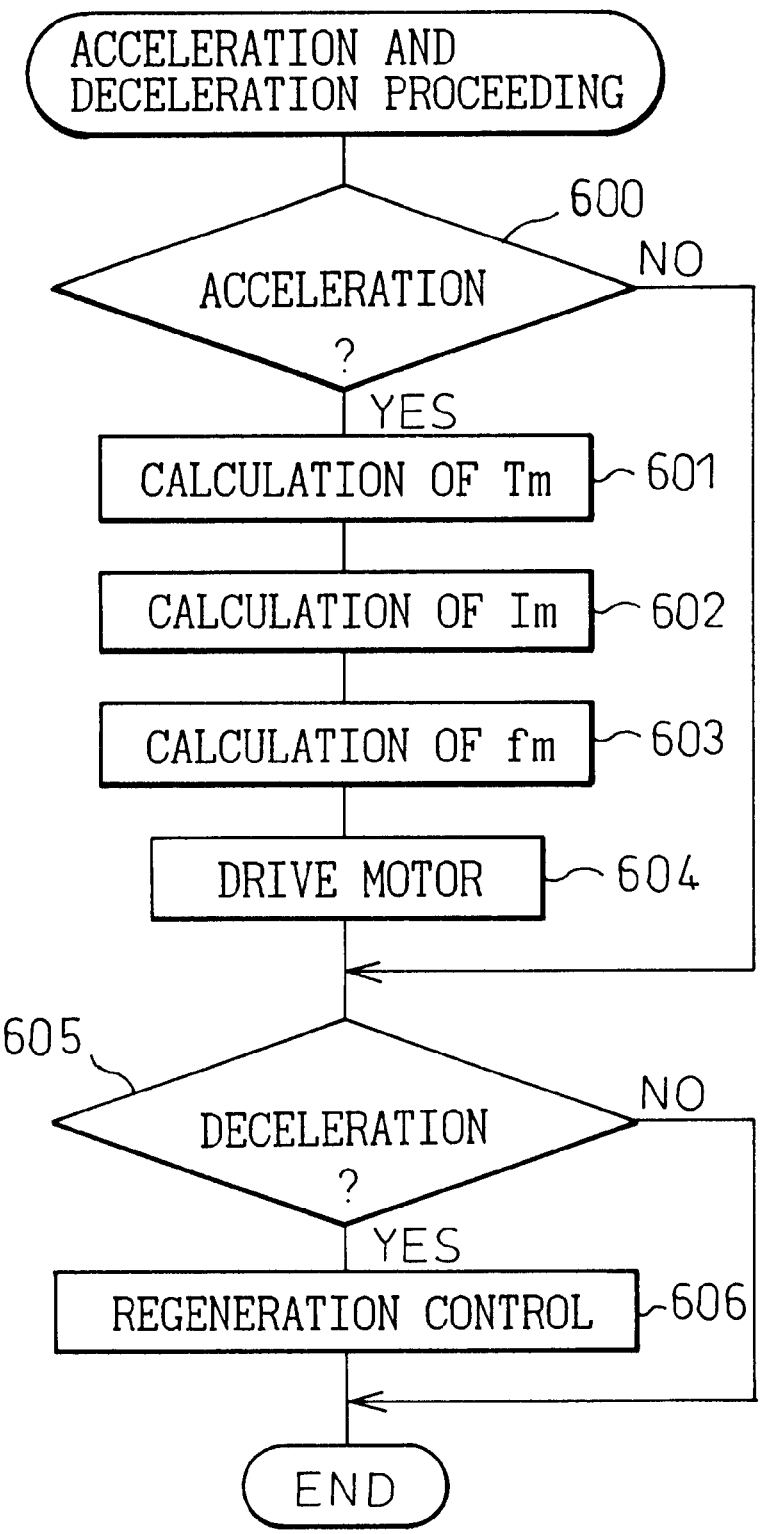
FIG. 21 is a flow chart of acceleration/deceleration processing.

FIG. 21 shows the processing routine at the time of acceleration and deceleration. This routine is executed by interruption every predetermined time.

Figure 22:
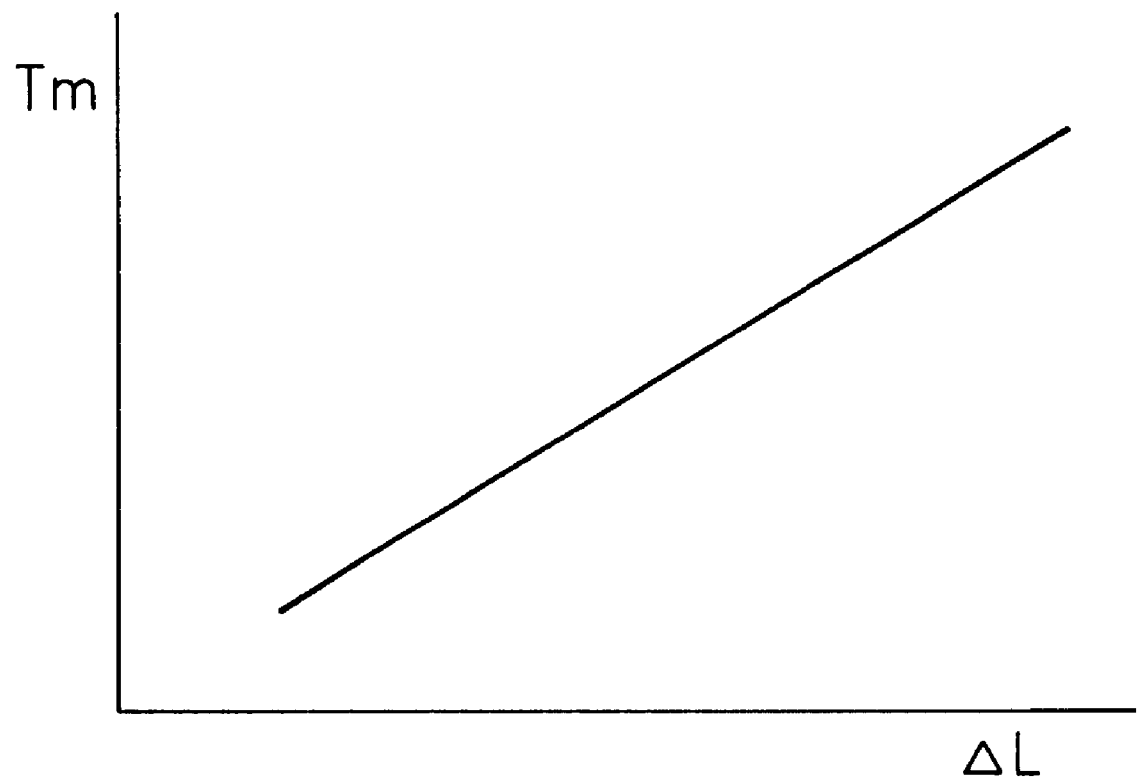
FIG. 22 is a view of the output torque of an electric motor.

Referring to FIG. 21, first, at step 600, it is decided if the engine is accelerating from the amount of change $\Delta L$ (>0) of the amount of depression L of the accelerator pedal 44. When the engine is accelerating, the routine proceeds to step 601, where the output torque Tm to be generated by the electric motor 37 is calculated. The output torque Tm becomes larger the larger the amount of change $\Delta L$ of the amount of depression L of the accelerator pedal 44 as shown in FIG. 22. Next, at step 602, the current value Im of the three-phase alternating current to be supplied to the electric motor 37 for the electric motor 37 to generate the output torque Tm is calculated. Next, at step 603, the frequency fm of the three-phase alternating current to be supplied to the electric motor 37 is calculated based on the engine rotational speed N. Next, at step 604, the three-phase alternating current having the current value Im and the frequency fm is supplied to the electric motor 37, whereby the electric motor 37 is driven. In this way, at the time of engine acceleration, the output torque of the electric motor 37 is superposed on the output torque of the engine.

Next, at step 605, it is decided if the engine is decelerating from the amount of depression L of the accelerator pedal 44 and the engine rotational speed N. When the engine is decelerating, the routine proceeds to step 606, where the electric motor 37 is operated as a generator and the generated electric power is stored in the battery 41.

While the invention has been described with reference to specific embodiments chosen for purpose of illustration, it should be apparent that numerous modifications could be made thereto by those skilled in the art without departing from the basic concept and scope of the invention.

What is claimed is:

1. A direct injection type engine provided with an exhaust passage, comprising:

a variable speed transmission connected with the engine and able to freely change a gear ratio;

an exhaust purification device arranged in the exhaust passage; and a control device for controlling a torque generated by the engine and a gear ratio of the variable speed transmission; at least two control lines which include a first control line and a second control line at a high torque side and low speed side of the first control line in the same required output being set as engine control lines showing the relationship between the engine rotational speed and required torque required for obtaining a required output, said control device causing the engine to generate a required torque on the first control line in accordance with the required output and controlling the gear ratio of the variable speed transmission to give an engine rotational speed on the first control line in accordance with the required output when the extent of activation of the exhaust purification device is low, said control device causing the engine to generate a required torque on the second control line in accordance with the required output and controlling the gear ratio of the variable speed transmission to give an engine rotational speed on the second control line in accordance with the required output when the extent of activation of the exhaust purification device is high;

wherein under an engine rotational speed and required torque on the second control line, the fuel economy is better than by the first control line, but the amount of harmful components in the exhaust gas becomes greater.

2. A direct injection type engine as set forth in claim 1, wherein said exhaust gas purification device is comprised of a particulate filter able to remove by oxidation particulate in an exhaust gas and having the function of absorbing $NO_x$ in the exhaust gas when the air-fuel ratio of the inflowing exhaust gas is lean and releasing the absorbed $NO_x$ when the air-fuel ratio of the inflowing exhaust gas is the stoichiometric air-fuel ratio or rich, and it is judged that the extent of activation of the exhaust gas purification device is high when it is estimated that an amount of particulate deposited on the particulate filter is less than a predetermined amount and a temperature of the particulate filter is in a temperature range giving an $NO_x$ absorption rate of more than a certain value.

3. A direct injection type engine as set forth in claim 2, wherein as said particulate filter, use is made of a particulate filter able to remove by oxidation any particulate in the exhaust gas flowing into the particulate filter without emitting a luminous flame when an amount of discharged particulate discharged from the combustion chamber per unit time is smaller than an amount of particulate which can be removed by oxidation without emitting a luminous flame per unit time on the particulate filter.

4. A direct injection type engine as set forth in claim 3, wherein a precious metal catalyst is carried on the particulate filter.

5. A direct injection type engine as set forth in claim 4, wherein an active oxygen release agent, taking in oxygen and holding the oxygen when excess air exists in the surroundings and releasing the held oxygen in the form of active oxygen when a concentration of oxygen in the surroundings falls, is carried on the particulate filter, and active oxygen is released from the active oxygen release agent when particulate deposits on the particulate filter, particulate deposited on the particulate filter being oxidized by the released active oxygen.

6. A direct injection type engine as set forth in claim 3, wherein the air-fuel ratio of the exhaust gas flowing into the particulate filter is made temporarily rich when $NO_x$ should be released from the particulate filter.

7. A direct injection type engine as set forth in claim 6, wherein the air-fuel ratio of the exhaust gas flowing into the particulate filter is made rich over a longer time than a time of release of $NO_x$ from the particulate filter when $SO_x$ should be released from the particulate filter.

8. A direct injection type engine as set forth in claim 1, wherein judging means is provided for judging if particulate has deposited to more than a certain extent on the particulate filter, said control means changing the control of the torque generated by the engine and the gear ratio of the variable speed transmission from control based on the second control line to control based on the first control line when it is judged that the particulate has deposited to more than a certain extent on the particulate filter when controlling the torque generated by the engine and the gear ratio of the variable speed transmission based on the second control line.

9. A direct injection type engine as set forth in claim 8, wherein intake air amount control means for controlling the amount of intake air to a target amount of intake air is provided, and an exhaust gas recirculation control valve for controlling the amount of recirculated exhaust gas recirculated in the intake passage of the engine is provided, said judging means judging that the particulate on the particulate filter has deposited to more than a certain extent when an opening degree of the exhaust gas recirculation control valve has become smaller than a predetermined opening degree when an amount of intake air is controlled to the target amount of intake air.

10. A direct injection type engine provided with an exhaust passage, comprising:
    a transmission connected with the engine and having a plurality of speeds automatically changeable;
    an exhaust purification device arranged in the exhaust passage; and
    a control device for changing a speed of the transmission; first boundary lines and second boundary lines at a lower vehicle speed side than the first boundary lines being set as speed boundary lines indicating the relationship between representative values of the required torque and representative values of the vehicle speed at boundaries of different speeds, said control device changing the speeds at the first boundary lines when the degree of activation of the exhaust gas purification device is low and changing the speeds at the second boundary lines when the degree of activation of the exhaust gas purification device is high.

11. A direct injection type engine as set forth in claim 10, wherein the fuel economy is better, but the amount of harmful components in the exhaust gas becomes greater when changing the speeds at the second boundary lines than when changing the speeds at the first boundary lines.

12. A direct injection type engine as set forth in claim 10, wherein said exhaust gas purification device is comprised of a particulate filter able to remove by oxidation particulate in the exhaust gas and having the function of absorbing $NO_x$ in the exhaust gas when the air-fuel ratio of the inflowing exhaust gas is lean and releasing the absorbed $NO_x$ when the air-fuel ratio of the inflowing exhaust gas is the stoichiometric air-fuel ratio or rich, and it is judged that the extent of activation of the exhaust gas purification device is high when it is estimated that an amount of particulate deposited on the particulate filter is less than a predetermined amount and a temperature of the particulate filter is in a temperature range giving an $NO_x$ absorption rate of more than a certain value.

13. A direct injection type engine as set forth in claim 12, wherein as said particulate filter, use is made of a particulate filter able to remove by oxidation any particulate in the exhaust gas flowing into the particulate filter without emitting a luminous flame when an amount of discharged particulate discharged from the combustion chamber per unit time is smaller than an amount of particulate which can be removed by oxidation without emitting a luminous flame per unit time on the particulate filter.

14. A direct injection type engine as set forth in claim 13, wherein a precious metal catalyst is carried on the particulate filter.

15. A direct injection type engine as set forth in claim 14, wherein an active oxygen release agent, taking in oxygen and holding the oxygen when excess air exists in the surroundings and releasing the held oxygen in the form of active oxygen when the concentration of oxygen in the surroundings falls, is carried on the particulate filter, and active oxygen is released from the active oxygen release agent when particulate deposits on the particulate filter, particulate deposited on the particulate filter being oxidized by the released active oxygen.

16. A direct injection type engine as set forth in claim 12, wherein the air-fuel ratio of the exhaust gas flowing into the particulate filter is made temporarily rich when $NO_x$ should be released from the particulate filter.

17. A direct injection type engine as set forth in claim 16, wherein the air-fuel ratio of the exhaust gas flowing into the particulate filter is made rich over a longer time than a time of release of $NO_x$ from the particulate filter when $SO_x$ should be released from the particulate filter.

* * * * *